US007616318B2

(12) United States Patent
Kikuchi

(10) Patent No.: US 7,616,318 B2
(45) Date of Patent: Nov. 10, 2009

(54) APPARATUS FOR MEASURING WAVEFORM OF OPTICAL ELECTRIC FIELD, OPTICAL TRANSMISSION APPARATUS CONNECTED THERETO AND A METHOD FOR PRODUCING THE OPTICAL TRANSMISSION APPARATUS

(75) Inventor: Nobuhiko Kikuchi, Tokyo (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 261 days.

(21) Appl. No.: 11/511,221

(22) Filed: Aug. 29, 2006

(65) Prior Publication Data

US 2007/0046952 A1 Mar. 1, 2007

(30) Foreign Application Priority Data

Sep. 1, 2005 (JP) ............................. 2005-252978

(51) Int. Cl.
*G01B 9/02* (2006.01)
(52) U.S. Cl. ..................................... 356/450; 356/73.1
(58) Field of Classification Search ................ 356/73.1, 356/450
See application file for complete search history.

(56) References Cited

U.S. PATENT DOCUMENTS 5,880,837 A * 3/1999 Roberts ...................... 356/450

6,525,522 B1 * 2/2003 Pickerd .................... 324/76.58

OTHER PUBLICATIONS

"Q7607 Optical Chirp Test Set", Advantest, Jan. 2003, pp. 1-5.
Griffin, R.A., et al, "10 Gb/s Optical Differential Quadrature Phase Shift Key (DQPSK) Transmission using GaAs/AlGaAs Integration", Optical Society of Amercia, 2002, pp. FD6-1-FD6-3.
"Agilent 86100C Infiniium DCA-J", Agilent Technologies, Inc., Jul. 20, 2005, pp. 1-12.
Dorrer, C., et al, "PDP 33 Direct measurement of constellation diagrams of optical sources", Optical Society of America, 2004, 2 Pages Total.
Ly-Gagnon, Dany-Sebastien, "Unrepeated 210-km Transmission with Coherent Detection and Digital Signal Processing of 20-Gb/s QPSK Signal", Optical Society of America, 2005, 2 Pages Total.

* cited by examiner

*Primary Examiner*—Hwa S Lee (Andrew)
(74) *Attorney, Agent, or Firm*—Stites & Harbison PLLC; Juan Carlos A. Marquez, Esq.

(57) ABSTRACT

An electric field waveform of an optical signal is precisely measured with high time resolution. Particularly, determination of inter-symbol interference has been difficult. Output light from the laser source is divided into first and second portions. The first portion is modulated by an optical modulator. The second portion is delayed by a delay line for the same quantity of delay as that of the first portion. The first and second portions are fed to a phase diversity circuit to configure a homodyne interferometer. An optical input sampling oscilloscope stabilizes a variable optical phase shifter to set an optical phase at a particular point of time to a fixed value using a pattern sync signal as a reference. An optical input sampling oscilloscope repeatedly averages optical waveforms and a CPU conducts three-dimensional display of the optical electric field waveform from which noise has been removed.

4 Claims, 13 Drawing Sheets

PHASE POINT ALLOCATION FOR QPSK SIGNAL

THREE-DIMENSIONAL LOCUS OF
OPTICAL ELECTRIC FIELD OF QPSK SIGNAL

I COMPONENT INTENSITY VARIATION DUE TO PHASE DEVIATION

AFTER PHASE STABILIZATION

IN-PHASE COMPONENT WAVEFORM WITH RESPECT TO TIME

OPPOSITE-PHASE COMPONENT WAVEFORM WITH RESPECT TO TIME (AFTER AVERAGING)

THREE-DIMENSIONAL SYNTHESIZED WAVEFORM

THREE-DIMENSIONAL EYE PATTERN DISPLAY

THREE-DIMENSIONAL EYE PATTERN DISPLAY

THREE-DIMENSIONAL EYE PATTERN VIEWED IN DIRECTION OF ARROW SHOWN IN FIG. 6A

PHASE PLANE DISPLAY

PHASE PLANE DISPLAY OF DATA FROM 40 PS TO 60 PS

SAMPLING EXAMPLE OF IN-PHASE/QUADRATURE COMPONENT OF RECEIVED OPTICAL ELECTRIC FIELD

DATA PLOTTED ON PHASE PLANE

FIG. 12A PHASE REFERENCE SIGNAL (PATTERN SYNC SIGNAL DELAYED FOR T)
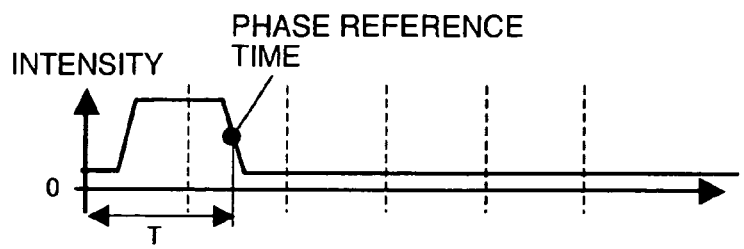
FIG. 12B COMBINED CLOCK SIGNAL DELAYED BY D
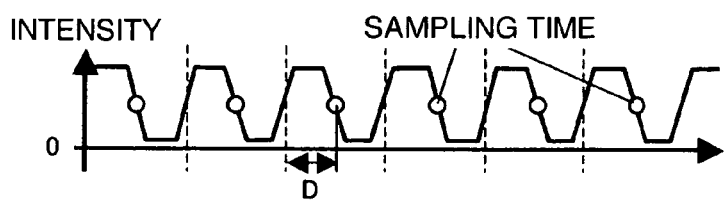
FIG. 12C FIRST COMBINED SAMPLING CLOCK
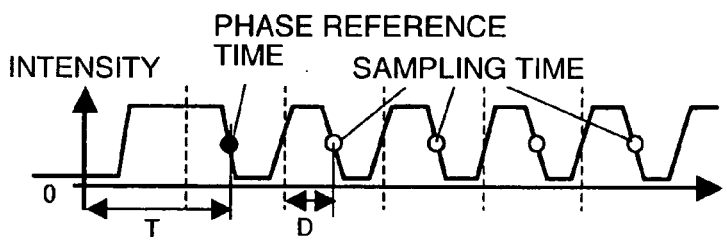
FIG. 12D FIRST SAMPLING
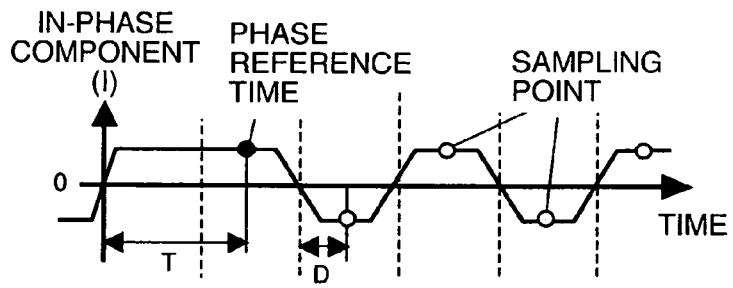
FIG. 12E SECOND COMBINED SAMPLING CLOCK
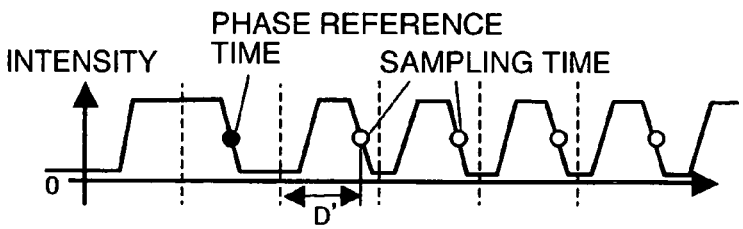
FIG. 12F SECOND SAMPLING
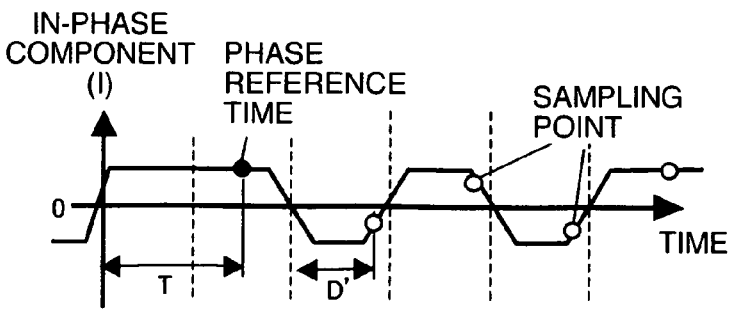

APPARATUS FOR MEASURING WAVEFORM OF OPTICAL ELECTRIC FIELD, OPTICAL TRANSMISSION APPARATUS CONNECTED THERETO AND A METHOD FOR PRODUCING THE OPTICAL TRANSMISSION APPARATUS

INCORPORATION BY REFERENCE

The present application claims priority from Japanese application JP2005-252978 filed on Sep. 1, 2005, the content of which is hereby incorporated by reference into this application.

BACKGROUND OF THE INVENTION

The present invention relates to evaluation and measurement of an optical waveform employed for high-speed optical fiber transmission.

In the existing optical fiber transmission to transmit information, optical signals are modulated according to intensity thereof into binary values, i.e., on and off. The optical signal modulation speed is rapidly increasing from 2.5 gigabits per second (Gbits/s) to 10 Gbits/s and then to 40 Gbits/s. The transmission distance of the optical fiber transmission is restricted by the wavelength dispersion of the optical fiber used for the optical transmission. It is known that the distance theoretically lessens in inverse proportion to the square of the bit rate. At a bit rate of 2.5 Gbits/s, the maximum transmission distance of the optical fiber transmission is about 1000 kilometers (km). The value rapidly lowers to about 60 km at a bit rate of 10 Gbits/s and only 4 km or less at a bit rate of 40 Gbits/s. Therefore, maintaining and elongating the transmission distance are quite a serious issue in the high-speed optical fiber communication. Particularly, a phenomenon called "frequency chirp" in an optical modulator to modulate optical signals is a phenomenon in which undesired phase modulation is added to the optical signal in association with the optical signal modulation conducted according to the intensity thereof. It is known that the optical signal transmission distance varies up to several times the original distance according to presence/absence and magnitude thereof. Therefore, evaluation of the frequency chirp characteristic is quite important for the optical modulator and the optical signals. The characteristic is precisely evaluated by a measuring device, for example, a chirp measuring device described in "Q7607 Optical Chirp Test Set" of ADVANTEST.

The amount of information items (transmission capacity) transmissible through one optical fiber cable is successively increasing due to growth in the number of wavelengths employed for the wavelength multiplexing and increase in the modulation speed. However, the total transmission capacity is limited to about 10 terabits per second (Tbits/s) and is remaining at this level for several years. This is because the wavelength band available for the optical transmission has reached the limit which is restricted by the wavelength band (corresponding to about 80 nanometer=10 THz for C, L, and S bands) of the optical fiber amplifier. It is hence not possible to increase the number of wavelengths and hence the transmission capacity cannot be expanded only by improving the signal bit rate as described above. Resultantly, it is assumed as essential that a new modulation method is developed to expand the transmission capacity to improve the utilization ratio of the frequency band so that the frequency band includes as many optical signals as possible.

To meet the requirement for the transmission efficiency improvement and the transmission distance elongation, there has been recently proposed a Phase Shift Keying (PSK) method in which the intensity as well as the phase of optical signals are modulated for the information transmission. For example, a Quadrature PSK (QPSK) method described in "10 Gb/s Optical Differential Quadrature Phase Shift Key (DQPSK) Transmission using GaAs/AlGaAs Integration" written by R. A. Griffin, et. al. (OFC2003, paper PD-FD6, 2003) is a method of modulating optical signals in which with the amplitude of electric field (intensity) of optical signals kept unchanged, the phase of the electric field is modulated into four values, i.e., 0°, 90°, 180°, and 270°. When compared with the conventional binary intensity modulation to transmit one-bit information by use of one symbol, this method employing the four-value phase state enables to transmit information of two bits by use of one symbol. To transmit the same amount of information items under the same condition, the modulation speed (symbol rate) can be lowered to one half of the original value. It is therefore possible that the frequency utilization efficiency is improved by transmitting the same amount of information items using about one half of the frequency band. At the same time, the transmission distance can be elongated by reducing the influence from the wavelength dispersion. As transmission methods positively employing the phase modulation, there have been proposed, for example, an optical duo-binary modulation, a Carrier Suppressed RZ (Return-to-Zero) (CSRZ) modulation, and an Amplitude and Phase Shift Keying modulation to modulate the phase and the amplitude at the same time.

In the modulation method employing the optical signal phase, the information is transmitted using a plurality of mutually different phase points (constellation) obtained by synthesizing the electric filed amplitude and the phase angle of optical signals each other. Therefore, it is important to precisely modulate the amplitude and the phase of optical signals according to a high-speed electric digital signal. Also in the conventional binary modulation, to conduct high-bit-rate or high-speed modulation at a bit rate equal to or more than gigabits per second, it is required to detect the reflection of a high-speed electric signal inputted to the optical modulator and the inter-symbol interference due to, for example, the insufficient frequency band of parts and integrated circuits (ICs) of the modulator to thereby possibly suppress deterioration in the optical waveform. To meet the requirement, precise waveform observing methods such as a method using an eye line display and a method using a histogram display have been explored to be broadly employed (reference is to be made to, for example, "Agilent 86100C Infiniium DCA-J" of Agilent Technologies. Especially, in the multivalue modulation to transmit information using a plurality of phase points, specifically, three or more phase points, the eye opening is larger than the binary signal. Also, transition takes place between the plural phase points to cause complicated inter-symbol interference. This leads to a problem of the difference between points of timing of the plural electric modulation signals. Therefore, it is required to even more precisely observe the waveform. The complicated variations in the phase and the intensity cause further complicated waveform variations after the transmission due to the wavelength dispersion and the nonlinear effect of the optical fiber and the detection in the receiver. To predict and to improve the transmission characteristics, it is quite important to precisely evaluate the optical electric field waveform of optical signals outputted from the optical modulator.

However, the phase component cannot be directly detected by, for example, a photodiode. It is difficult to observe the phase component of optical signals and the direct measurement of the optical electric field waveform of optical signals is rarely carried out. Examples of observation of phase points in multivalue phase modulation signals have been reported in "Direct measurement of constellation diagrams of optical sources" written by C. Dorrer, J. Leuthold and C. R. Doerr in post-deadline paper PDP-33, OFC, 2004 and "Unrepeated 210-km Transmission with Coherent Detection and Digital Signal Processing of 20-Gb/s QPSK Signal" written by Dany-Sebastien Ly-Gagnon, Kazuhiro Katoh and Kazuro Kikuchi in paper OTuL4, OFC/NFOEC 2005, 2005. For example, the former reports the direct measurement of phase points of the QPSK signal for the first time. Description will now be given of two phase measuring methods of the prior art.

The frequency chirp measuring apparatus represented by Q7607 of Advantest as described in "Q7607 Optical Chirp Test Set" of ADVANTEST is a measuring apparatus using an optical frequency discriminator such as a Mach-Zehnder interferometer to convert the optical frequency chirp (frequency variation) into optical intensity in the observation.

According to "Direct Measurement of Constellation Diagrams of Optical Sources" and "Unrepeated 210-km Transmission with Coherent Detection and Digital Signal Processing of 20-Gb/s QPSK Signal" described above, digital phase diversity measurement is employed to observe allocation of phase points of multivalue phase modulated optical signals. This is a kind of the coherent homodyne detection method in which there is prepared a local optical source substantially equal in the wavelength to the signal light to cause homodyne interference between local light emitted from the local optical source and the signal light to receive the resultant light by a photodiode. The optical electric component of the signal light is converted into intensity of the electric signal. This signal is sampled at a high speed by an oscilloscope in a real time fashion and is converted into a digital data string to be then transferred to a personal computer. After having received the data string, the computer analyzes the data of a predetermined period of time to estimate and to calculate allocation of phase points of the phase modulation signal. Description will next be given in detail of the principle of the operation by referring to FIG. 8.

A pulse pattern generator 112 generates binary pseudo-random electric digital signals (D1, D2) of two systems of, for example, 10 Gbits/s. The signals are amplified respectively by driver circuits 106-1 and 106-2 to be inputted via drive signal input lines 107-1 and 107-2 to an optical modulator 108 as a measurement object. A laser beam emitted from a laser source 101 is modulated by these symbol patterns to be converted into phase modulation light such as optical QPSK signals of 20 Gbits/s. This signal as an observation object is fed to a signal light input port 132 of an optical phase diversity circuit 113. To a reference light input port 135, local light emitted from a local light laser source 140 is inputted, the source 140 continuously oscillating (or producing short pulses) with an optical frequency almost equal to that of the input light.

The optical phase diversity circuit 113 is an optical circuit also called "optical 90-degree hybrid" which divides each of the local light and the signal light which are inputted thereto into two portions to output the divided signals to two output ports 133 and 134, the signals having substantially the same intensity. In the configuration, the in-phase component output port 133 is adjusted such that the local light interferes with the signal light when their optical phases are in an in-phase state. The quadrature component output port 134 is adjusted such that the local light interferes with the signal light when their optical phases are in an quadrature state. Light from each port is fed to a high-speed optical oscilloscope 141 to be converted into an electric signal. From the signal received from the in-phase output port 133, there is obtained an optical electric field waveform of the component which is in phase with the reference light of the signal light. From the signal received from the quadrature output port 134, there is obtained an optical electric field waveform of the component which is orthogonal to the reference light of the signal light.

The high-speed oscilloscope 141 operates at a sampling speed of 10 to 20 giga-samples per second to conduct high-speed analog-to-digital (A/D) conversion for each of the in-phase and quadrature electric field waveforms at a speed of one to two samples per bit (at a central time of eye opening in an ordinary case) as shown in FIG. 9A. The resultant data is sequentially stored in an internal memory (about 100000 bits in an ordinary case). When the measurement is continuously conducted, the memory is full of data in about several microseconds. The measurement is once stopped and all data 121-2 is transferred in a batch from the memory to a Central Processing Unit (CPU) 122. In the CPU 122, the data items are mapped in a two-dimensional graph in which the in-phase (I) component and the quadrature (Q) component of the same time are associated respectively with the ordinate and the abscissa of the graph. This re-constructs the optical electric field phase, and a signal 121-3 indicating the resultant graph is outputted to a display 123.

Actually, each of the local light and the signal light includes large phase noise in a band from several hundred kilohertz to several megahertz, and it is difficult to completely equalize the two lasers with each other in the emission wavelength. Therefore, the optical phase of each laser beam is unstable and includes deviation at a high speed of the order of several megahertz to about one hundred megahertz. This results in a problem that the phase angle $\phi$ of the phase point in FIG. 9B rotates at a high speed of several megahertz to about one hundred megahertz and hence the state of the phase of the optical signal cannot be measured. For this difficulty, according to "Direct Measurement of Constellation Diagrams of Optical Sources" described above, there is executed processing in which on assumption that the optical phase at a point at which the intensity of optical pulses is fixed is observed and the optical phase rotates at a fixed speed by the phase deviation, the phase deviation component is estimated to be removed. In "Unrepeated 210-km Transmission with Coherent Detection and Digital Signal Processing of 20-Gb/s QPSK Signal" described above, there is executed digital data processing which mathematically calculates the fourth power of the synthesized electric component to remove the phase modulation component in 90-degree units due to the phase modulation. From the remaining fractional components of the phase, a phase rotation component from several megahertz to about one hundred megahertz is detected to be removed. According to the report of "Direct Measurement of Constellation Diagrams of Optical Sources" above, the allocation of the phase points of the QPSK signal are directly measured for the first time as a result.

SUMMARY OF THE INVENTION

Description will be given of the problems of the conventional method to be solved by the present invention.

The conventional chirp measuring apparatus does not directly measure the optical phase itself. The apparatus conducts indirect measurement to measure frequency deviation, i.e., a differential quantity of the optical phase with respect to time. This leads to a problem that the absolute value of the optical phase cannot be measured and a problem that the measurement is accompanied by quite a large phase measurement error. For example, a fixed quantity (e.g., n) of the phase variation associated with the phase modulation causes a remarkably large frequency chirp in a short period of time in a high-speed modulation waveform. It is hence likely that the measurement precision lowers due to the limit of the time resolution and the restriction of the frequency band of the measuring apparatus. Also, the linear measurement range of the apparatus can be easily exceeded to cause a measurement error. Contrarily, in a case in which the phase variation slowly occurs through at least several bits, there exists a problem that the frequency chirp is too small to be appropriately measured. In general, the digital phase modulation waveform includes a phase modulation component which is slow like a direct current (DC). Therefore, it is not possible to use the frequency chirp measuring apparatus for the evaluation of the inter-symbol interference of such signals.

On the other hand, the conventional phase observing method represented by the digital phase diversity method is accompanied by problems as below.

The first problem resides in the difficulty in the evaluation of the inter-symbol interference (transmission waveform distortion) of the optical electric field waveform. It is difficult to determine the waveform timing jitter and the transition with respect to time of the waveform for each modulation pattern only by plotting the phase points in a phase space as in the conventional example. The methods to visualize the optical phase modulation waveform include a method to obtain a received waveform through a detection such as an optical delay detection and a method in which the in-phase component and the quadrature component of the electric field are homodyne detected to independently obtain an electric field waveform and an eye pattern for the components. However, the received waveform after the detection includes waveform distortion and hence is not suitably used to evaluate the transmitted waveform. The method of independently observing the eye pattern of the in-phase and quadrature components is unable to completely obtain the variation in the optical electric field and is hence not suitable for the evaluation of an optical signal such as the QPSK signal in which the in-phase and quadrature components are simultaneously modulated. There also exists a problem that the phase detection sensitivity is zero in the vicinity of a position where the in-phase component takes the minimum amplitude or the maximum amplitude and hence the phase rotation quantity of the optical signal cannot be evaluated.

The second problem is the difficulty in the precise observation of the optical electric field waveform. Even by use of a real-time oscilloscope operating at the highest speed at present, the sampling speed is limited to about 20 giga-samples per second. This corresponds to an operation in which one or two sample points are obtained in one symbol of the optical waveform at a speed of 10 giga-symbols per second. In an example described in "Direct Measurement of Constellation Diagrams of Optical Sources" described above, short optical pulses are employed in the optical measurement to observe the phase transition in the repetitive optical pulses with high time resolution. To evaluate the inter-symbol interference, it is required to evaluate an optical signal waveform digitally modulated using a long symbol pattern. However, in the conventional technique, such waveform cannot be measured with high time resolution. For example, in the evaluation of the inter-symbol interference of a waveform with ordinary intensity, it is general to evaluate a waveform of a length from several tens of bits to several millions of bits with resolution from several tens of points to several hundreds of points in one symbol by use of a sampling oscilloscope.

The third problem resides in that the noise component cannot be removed from the electric field waveform and hence the quantity or magnitude of waveform distortion (inter-symbol interference) cannot be determined. Since large optical noise and large electric noise are superimposed onto or mixed with the results of the electric field measurement, if the results of measurement of the in-phase and quadrature components are directly plotted in a two-dimensional form, there appear considerable deviations due to such noise as shown in FIG. 9B and FIGS. 3 and 4 of "Direct Measurement of Constellation Diagrams of Optical Sources" described above. This makes it difficult to observe the quantity of the inter-symbol interference component in the waveform and the quantity of timing jitter due to, for example, frequency characteristics of the optical modulator and the driver circuit.

The fourth problem is the difficulty in the long-term precise observation of the waveform. When the optical signal speed is 10 giga-symbols per second, the memory in the real-time high-speed oscilloscope is used up by the measured data in only several microseconds. Thereafter, the measurement is once stopped to move the data of the memory to the personal computer to analyze the obtained data. In the conventional method to remove the phase deviation through the digital phase processing, it is not possible to determine the optical phase variation during the period of time in which the measurement is not carried out. Even the measurement is again conducted, the obtained result cannot be appropriately coupled with the results of the previous measurement. This arises a problem that the long-term measurement is not possible. In the phase rotation estimating method of the prior art, the slow drift of the phase point caused by the inter-symbol interference while the optical signal is being modulated using a long symbol pattern with a period from several kilohertz to several megahertz cannot be discriminated from the phase deviation of the laser source. Therefore, the slow drift is removed together with the phase deviation of the laser source, resulting in a problem that the waveform cannot be appropriately observed.

The fifth problem resides in the restriction on the modulation method to module the optical signal as the observation object. In the phase deviation detection method of "Unrepeated 210-km Transmission with Coherent Detection and Digital Signal Processing of 20-Gb/s QPSK Signal" described above, there is employed a procedure to calculate the fourth power of the received signal. This is applicable only to the QPSK signal in which the phase of light is equally modulated into four values. Therefore, the detection method is not applicable to general modulation signals such as modulation signals obtained in other phase modulation methods such as a binary modulation method, those produced in a modulation method also including the intensity modulation, and those obtained in other modulation methods such as a duo-binary modulation method. It is hence required to prepare a distinct method to detect the optical phase deviation in each case. This leads to a problem that the method is not generally applicable.

It is therefore an object of the present invention to provide a simple method of observing an optical electric field waveform with higher precision and higher time resolution, the method being applicable to any high-speed modulation optical signal such as a phase modulation signal and a conventional intensity modulation signal.

According to the present invention, which will be described below, there is employed optical homodyne interference, particularly, a self-homodyne interference method using a single light source. The self-homodyne interference method has an aspect that there are used a small amount of light sources. However, in general, a complex optical wiring arrangement is required so that the light before modulation emitted from the light source interferes with the light after modulation. This leads to a problem that the method is applicable only to operation in a laboratory and is not applicable to ordinary optical transmitters. Another object of the present invention is to implement an optical transmitter to which the optical electric field waveform measuring apparatus proposed according to the present invention is easily applicable and to implement a practical method of evaluating the optical electric field waveform and a method of adjusting the optical electric field waveform according to the present invention.

The problem of the difficulty in the evaluation of the inter-symbol interference of the optical electric field waveform can be solved by presenting, in a three-dimensional image, the electric field components of the optical signal measured by sampling each component with respect to time. Specifically, the components are arranged in time series as a three-dimensional optical electric field waveform or as a three-dimensional eye pattern. Particularly, this is achieved by a function in which the direction to observe the optical electric field waveform is changed to a particular direction desired by the user according to necessity and which selectively displays the three-dimensional optical electric field waveform and the three-dimensional optical electric field eye pattern according to the specified particular range of time, amplitude, angle, or coordinates.

The problem of the difficulty in the precise observation of the electric field waveform of the optical signal, the problem of the difficulty in the long-term precise observation of the waveform, and the difficulty of the restriction on the method of modulating the optical signal as the observation object can be removed by stabilizing the homodyne interferometer employed for the electric field measurement. Specifically, the phase value, the in-phase component, or the quadrature component of the optical electric field measured at timing synchronized with the symbol pattern takes a fixed value. It is also possible to conduct the control operation such that the phase value, the in-phase component, or the quadrature component of the optical electric field measured at a point of time after a predetermined period of time relative to the start point of the symbol pattern takes a fixed value. Alternatively, the phase value, the in-phase component, or the quadrature component of the optical electric field of the input light averaged for a predetermined period of time beginning at a point of time after a predetermined period of time relative to the start point of the symbol pattern is fixed. The problems can also be removed as below. Assume, as a reference phase, either one of the phase value of the optical electric field measured at timing synchronized with the symbol pattern, the phase value of the optical electric field measured at a point of time after a predetermined period of time relative to the start point of the symbol pattern, and phase value of the optical electric field of the input light averaged for a predetermined period of time beginning at a point of time after a predetermined period of time relative to the start point of the symbol pattern. Within an interval of time sufficiently shorter than the characteristic time of the phase deviation, the reference phase and the optical phase at a particular point of time are measured to calculate the difference therebetween as the optical phase at the associated point of time.

The problem that the noise component is not removable and hence the quantity or the waveform distortion (inter-symbol interference) cannot be determined can be solved using, together with the above operation, a function in which the optical electric field is repeatedly measured for each period of the symbol pattern to average a plurality of measured values which are at the same point of time relative to the start point of the symbol pattern and a function to calculate a moving average of measured values of the optical electric field by moving the values in a direction of time.

The problem that the self-homodyne interference method is not applicable to the ordinary optical transmitter can be solved as below. The optical transmitter includes a reference light output port. A light before modulation is beforehand obtained from the laser source in the optical transmitter to be delivered from the port to an external device. At waveform evaluation, the reference light from the reference light output port and the modulated light from the modulated light output port are fed to the optical electric field waveform measuring apparatus of the present invention. The apparatus causes self-interference between the reference light and the modulated light to observe the optical electric field waveform.

If the internal laser source is not available due to a problem such as a characteristic of interference and insufficiency in the intensity, there is disposed an input port to input external reference light. The reference light is modulated by the optical modulator to be outputted from the modulated light output port. In an external device, the self-homodyne interference is caused using the modulated light.

As described above, the present invention also aims at implementing an optical transmitter to which the optical electric field waveform measuring apparatus proposed according to the present invention is easily applicable and implementing a practical method of evaluating the optical electric field waveform and a method of adjusting the optical electric field waveform according to the present invention.

According to the present invention, the electric field components separately measured in advance are synthesized each other to display a three-dimensional optical electric waveform and a three-dimensional eye pattern. This leads to an advantage that the optical electric waveform is instinctively recognized to easily evaluate the quantity of inter-symbol interference and the quantity of jitter. Particularly, by displaying signals in a desired time range, with desired amplitude, and in a desired angle range viewed from a desired angle, it is possible that the phase points and the eye opening arranged in a complex way in the three-dimensional space are selectively displayed and observed. This brings about an advantage that the evaluation is facilitated.

By use of methods such as a method in which the phase of the optical electric field waveform at a particular point of time synchronized with the symbol pattern is set as the phase reference, the precision is improved in the stabilization of the interferometer, the phase angle detection, and the optical electric field measurement. Since the optical phase reference is obtainable at any point of time, the long-term measurement is enabled. There is also attained an advantage that even if the measurement is interrupted, successive waveform data items can be obtained.

The method is independent of the modulation method of modulating the optical signal as the observation object and is advantageously applicable to any optical signal.

It is also possible to average a plurality of measurement results to remove the noise component. This leads to an advantage that the measurement precision is further improved and the quantity of the inter-symbol interference of the waveform can be correctly and easily evaluated. The function to separately average each component enhances the advantage of the noise removal when the noise of each component is independent such as in a case in which the in-phase component and the quadrature component are sequentially measured by conducting a changeover therebetween. The function to independently average the amplitude component and the phase angle component is effective to smooth a signal in which the deviation varies between the amplitude component and the phase angle component such as a signal with a large deviation in the phase angle. The function to smooth the phase points after the synthesis thereof in a vectorial manner is effective to smooth a signal with a uniform deviation in the phase space, for example, a signal considerably influenced by the electric and/or optical noise.

By disposing a reference light output port such that a light before modulation is beforehand obtained from the laser source in the optical transmitter to be delivered from the output port to an external device, it is possible to easily obtain the reference light to be used for the self-homodyne interference also in an optical transmitter as a complete product. It hence results in an advantage that the optical electric field waveform measuring apparatus of the present invention can be used to measure the waveform. Moreover, by disposing in the optical transmitter an input port to input external reference light such that the optical transmitter modulates the external reference light and outputs the result of the modulation from a modulated light output port, it is advantageously possible to conduct high-precision waveform measurement using a laser source causing stronger interference.

In this situation, by disposing part of the optical path of the reference light in the optical transmitter and by setting the path length to a predetermined value in advance, there is obtained an advantage. That is, it is not required to adjust the length of the reference light path for each optical transmitter when the optical electric field waveform is measured according to the present invention. By disposing a plurality of optical output ports in the optical transmitter, it is advantageously possible to simultaneously carry out the measurement and the adjustment of the optical electric field waveform while conducting the error ratio measurement and the information transmission.

If the optical transmitter beforehand includes a circuit to generate a repetitive symbol pattern such that the optical transmitter in a state driven by the repetitive symbol is connected to the optical electric field waveform measuring apparatus of the present invention to stabilize the interferometer and to average the waveform using the trigger signal synchronized with the symbol pattern, there is obtained an advantage that the waveform is measured with higher precision.

In the assembly process of the optical transmitter, by employing a process in which while measuring the optical electric field waveform by the optical electric field waveform measuring apparatus of the present invention, the waveform is adjusted to an ideal state; there is attained an advantage that the waveform distortion of the optical transmitter is reduced and the transmission characteristics such as the receiving sensitivity is improved.

Other objects, features and advantages of the invention will become apparent from the following description of the embodiments of the invention taken in conjunction with the accompanying drawings.

BRIEF DESCRIPTION OF THE DRAWINGS

FIG. 12A is a graph to explain the sampling in the third embodiment, specifically showing the phase reference signal (pattern sync signal delayed for T).

FIG. 12B is a graph to explain the sampling in the third embodiment, specifically showing the synthesized clock signal delayed for D.

FIG. 12C is a graph to explain the sampling in the third embodiment, specifically showing the first synthesized sampling clock.

FIG. 12D is a graph to explain the sampling in the third embodiment, specifically showing the first sampling.

FIG. 12E is a graph to explain the sampling in the third embodiment, specifically showing the second synthesized sampling clock.

FIG. 12F is a graph to explain the sampling in the third embodiment, specifically showing the second sampling.

DESCRIPTION OF THE EMBODIMENTS

Figure 1:
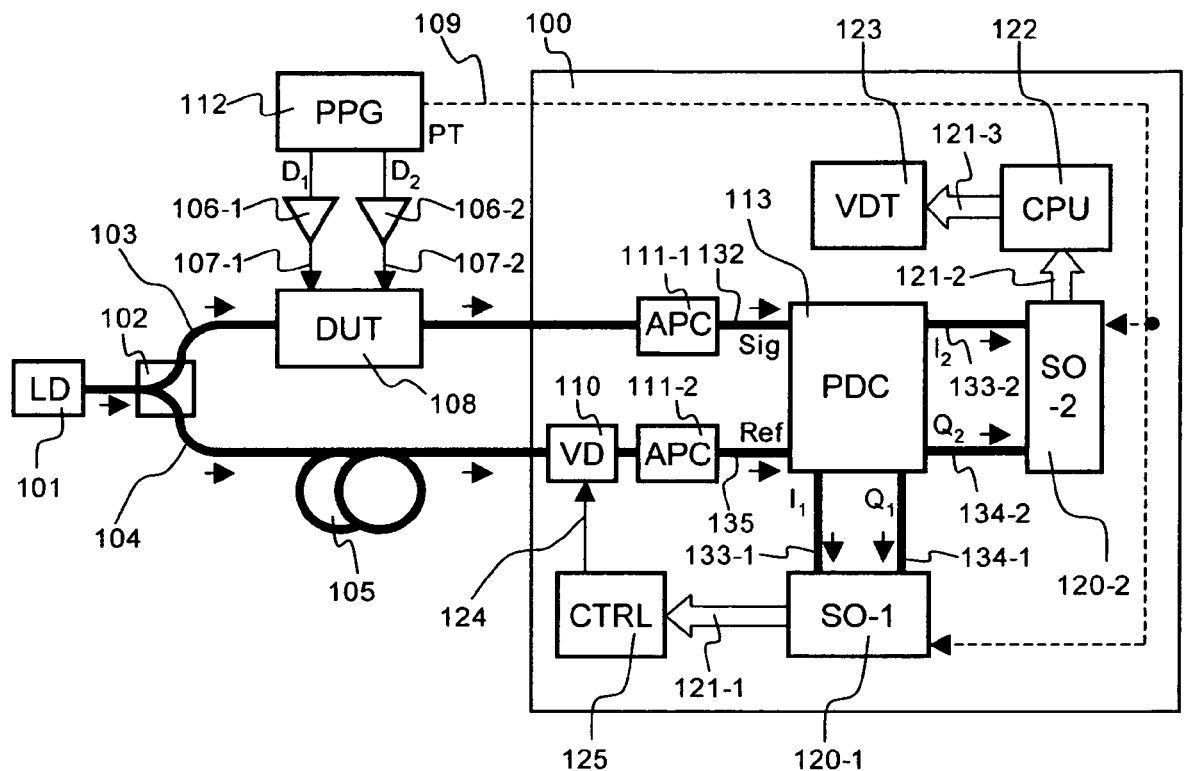
FIG. 1 is a configuration diagram showing a first embodiment of the present invention.

In a best mode of embodying the present invention, the output light emitted from a laser source 101 is divided into a first portion and a second portion as shown in FIG. 1. The first portion is modulated by an optical modulator 108. The second portion is delayed by a delay line for the same amount of time as that of the first portion and is fed to a phase diversity circuit 113 to thereby configure a homodyne interferometer. While stabilizing a variable optical phase shifter 110 by an optical or light input sampling oscilloscope 120-1 such that the optical phase at a predetermined point of time is a fixed value using a pattern sync signal 109 as a reference signal, a light input sampling oscilloscope 120-2 acquires an optical wave to repeatedly conduct averaging and a CPU 122 re-constructs an optical electric field trace to display on a display 123 a three-dimensional eye pattern of the optical electric field wave.

First Embodiment

FIG. 1 shows the first embodiment of the present invention in a configuration diagram, showing a configuration example of an optical waveform observing apparatus according to the present invention. A laser beam emitted from the laser source 101 is divided by an optical coupler 102 into a first portion and a second portion to be fed respectively to an optical fiber 103 for signal light constituting a signal light path and an optical fiber 104 for reference light constituting a reference light path. The first portion passes through an optical modulator 108 to generate an optical signal as a measurement object and is fed to an optical waveform observing apparatus 100. The input signal passes through an automatic polarization controller 111-1 and is then delivered to a signal light input port 132 of an optical phase diversity circuit 113.

On the other hand, the second portion of the laser beam passes through an optical fiber delay line 105, a variable optical phase shifter 110, and an automatic polarization controller 111-2 to be inputted to a reference light input port 135 of the optical phase diversity circuit 113. This resultantly configures a self-homodyne interferometer which causes interference between the reference light and the signal light which are obtained from one and the same light source.

Figure 2:
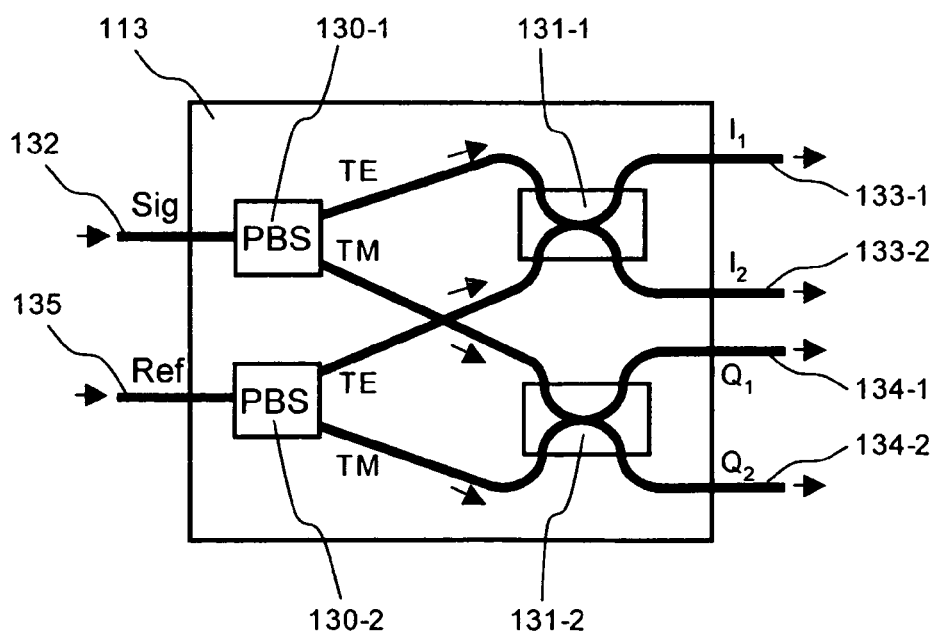
FIG. 2 is a configuration diagram of an optical phase diversity circuit 113 in the first embodiment.

The optical phase diversity circuit 113 includes two polarized beam splitters 130-1 and 130-2 and two 2-by-2 optical couplers 131 (131-1, 131-2). Light signals to be inputted to the signal light input port 132 and the reference light input port 135 are beforehand adjusted respectively by the automatic polarization controllers 111-1 and 111-2 of FIG. 1 to an input polarization state of "45°", for example, as shown in FIG. 2. That is, the horizontal-directional components (TE; Transverse Electric). are delivered by the two-by-two optical couplers 131 to interfere with each other for the detection of the in-phase component. Also, the vertical components (TM; Transverse Magnetic) are delivered by the two-by-two optical couplers 131 to interfere with each other for the detection of the quadrature component with a phase shift of 90°. In this connection, two in-phase components including an in-phase component and its inverted component are obtained from two in-phase component output ports 133-1(I1) and 133-2(I2), and two quadrature components including a quadrature component and its inverted component are obtained from two quadrature component output ports 134-1(Q1) and 134-2 (Q2). In the example of FIG. 1, the output ports 133-1 and 134-1 are inputted or connected to the optical input sampling oscilloscope 120-1 disposed to stabilize the interferometer phase, and the output ports 133-2 and 134-2 are inputted to the optical input sampling oscilloscope 120-2 disposed to observe the optical electric field waveform.

The intensity of the reference light emitted from each of the output ports is set to a value which is in a range from several times to several tens of times the intensity of the signal light emitted at the same time for the following reason. That is, by sufficiently reducing the amplitude of the intensity modulation component of the signal light detected by the optical input sampling oscilloscope, the amplitude of the electric field component of the signal light caused by the beat between the signal light and the reference light is fully increased.

For the automatic polarization controllers 111-1 and 111-2, if the signal light and the reference light are inputted in an appropriate polarization state to the respective phase diversity circuits, there may be employed, for example, a manual polarization controller to conduct manual adjustment or there may be employed a polarizer transmitting only a particular polarized wave.

The configuration shown in the drawing is an example of the waveform observation of an optical QPSK signal after the 4-value phase modulation. The pulse pattern generator 112 generates pseudo-random electric digital signals D1 and D2 of two channels at 10 gigabits per second. The signals D1 and D2 are amplified respectively by the driver circuits 106-1 and 106-2 and is fed via the drive signal input lines 107-1 and 107-2 to the optical modulator 108. The laser beam emitted from the laser source 101 is phase modulated using these symbol patterns into optical QPSK signals with a symbol rate of 10 giga symbols per second and a bit rate of 20 gigabits per second. Although description will be given according to an example of the optical QPSK signal, the present invention is in principle applicable to almost all optical modulation methods.

Figure 3A:
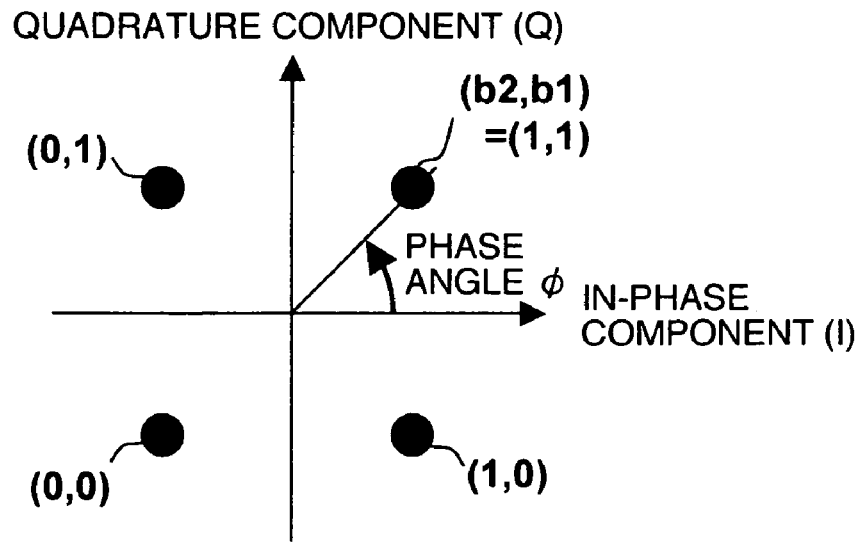
FIG. 3A is a graph to explain the allocation of phase points for the QPSK signal in the first embodiment.
Figure 3B:
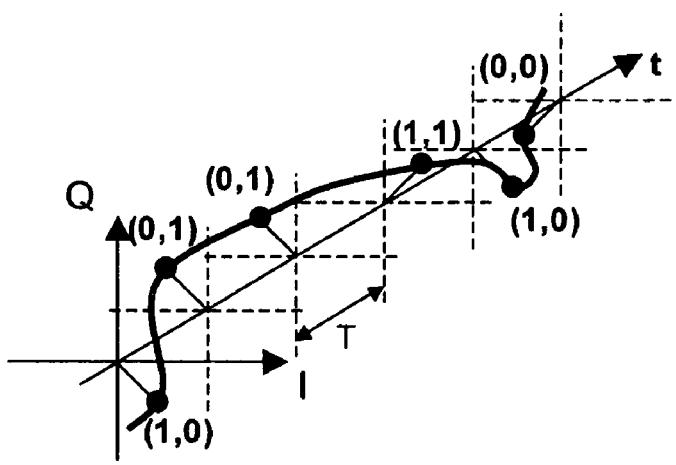
FIG. 3B is a graph to explain the three-dimensional locus of the optical electric field of the QPSK signal in the first embodiment.

FIGS. 3A and 3B are graphs to explain the state of the optical QPSK signal phase. As shown in FIG. 3A, the signal has four phase points on the phase plane in which the in-phase component of the optical electric field is presented along the abscissa and the quadrature component thereof is presented along the ordinate. The respective phase points are allocated on a circle with a phase angle difference of 90° therebetween and are assigned with two-bit information items as (0,0), (0,1), (1,0), and (1,1), respectively. FIG. 3B shows a three-dimensional display example schematically representing the optical electric field of-the QPSK signal. Each phase point corresponds to a phase state of the optical signal at a central time of the symbol with time width T (100 ps in this example). The optical electric field makes a transition to pass either one of the phase points at an interval of time T. The object of the present invention is the observation of the optical electric field waveform.

Figure 4A:
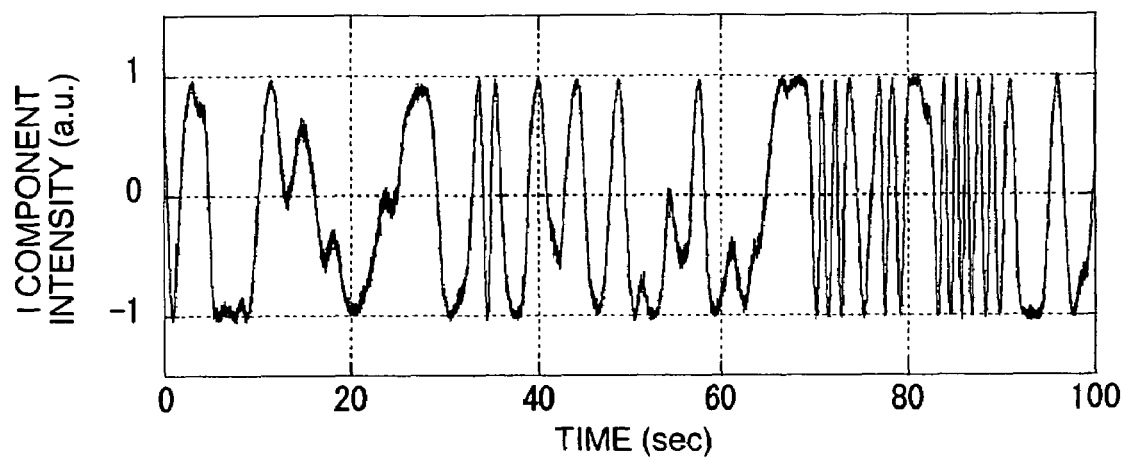
FIG. 4A is a graph showing an example of phase stabilization in a self-homodyne interferometer in the first embodiment, specifically showing variation in the I component intensity due to phase deviation.

As described in conjunction with the conventional example, the output light from the laser source 101 includes a large phase deviation with respect to time. In this example, the influence from the phase noise of the optical signal is remarkably lowered by using a self-homodyne interferometer in which laser beams emitted from one laser source interfere with each other. The delay fiber lines 105 conduct adjustment by its signal delay feature to substantially equalize the path length of the signal light to that of the reference light from the laser source 101 to the optical diversity circuit 113. If the delay is almost equal for both light signals, the signals simultaneously emitted from the laser source interfere with each other. This cancels the influence from the phase noise almost completely. According to results of experiments, in a case in which, for example, the signal source has a line width of about 100 kilohertz, when the delay difference is set to about 30 centimeters, the phase deviation due to the phase noise can be measured with precision of several degrees or less. However, due to the external factors such as the environmental temperature variation and vibration, each path length gradually varies by a length exceeding the wavelength order (micron order) of light. Therefore, the phase of the observed light signal slowly varies at a time constant from several hertz to several tens of hertz. FIG. 4A shows an example of the deviation in the optical signal phase. In this example, the optical modulator 108 stops modulation to obtain a light signal before modulation. Through self-homodyne interference between the light signal and the reference light, an optical electric field is outputted from the in-phase component output port 133-1 to thereby observe intensity of the in-phase component of the optical electric field (the maximum amplitude is normalized within ±1.0). The intensity of the in-phase component, which is inherently fixed with respect to time, randomly varies in association with the deviation in the optical fiber interferometer in the example. It is recognized that there occurs a phase rotation with a maximum rotary speed of one rotation per second. To cope with the difficulty, an optical variable phase shifter 110 is disposed at an intermediate point of the path of the reference light in FIG. 1 so that a control circuit 125 conducts a stabilizing control operation to cancel the phase deviation.

There may be employed, for example, a method of stabilizing the phase of the interferometer to conduct control as below. The optical electric field of the signal light detected by the optical input sampling oscilloscope 120-1 is averaged with respect to time for a long period of time to keep the mean phase unchanged. This method is applicable to the intensity modulation signal and the like. However, the method is not applicable to the modulation method of signals such as the QPSK signal which takes all phase states in average since the averaged signal amplitude becomes zero. It is also possible that a point of time of non-modulation is disposed in the symbol pattern of the optical signal to keep the phase fixed at the point of time. However, the method requires a special pattern generator circuit. Also, the inter-symbol interference is evaluated according to a modulation pattern different from the actual modulation pattern. This leads to an error in the measurement results (a portion of successive mark symbols or the like may be employed only in the binary phase modulation and the binary intensity modulation).

Figure 4B:
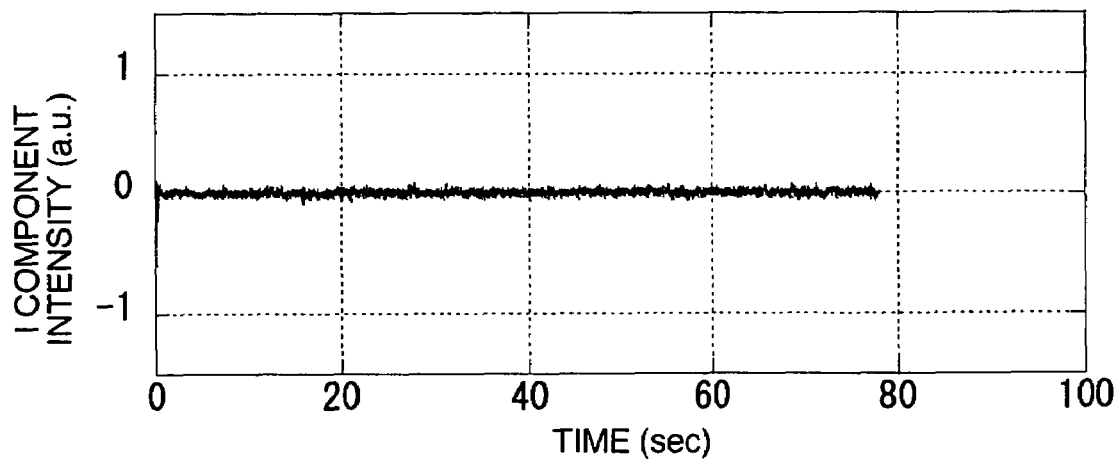
FIG. 4B is a graph showing an example of phase stabilization in a self-homodyne interferometer in the first embodiment, specifically showing the variation after the phase stabilization.

In conjunction with the example, description will be given of a method of stabilizing the phase of the optical signal at a particular point of time to a fixed value using the pattern sync signal as the reference signal. To the oscilloscope 120-1 of FIG. 1, a pattern sync signal 109 synchronized with a data repetitive period from the pulse pattern generator 112 is supplied. The oscilloscope 120-1 samples the intensity of the in-phase component at a point of time after a predetermined period of time relative to the pattern sync signal and transmits the sampled data via the data path 121-1 to the controller 125 at a frequency equal to or more than the deviation of the interferometer. The controller 125 controls the amount of phase shift of the variable phase shifter 110 to continuously keep the intensity of the in-phase component at a fixed value (for example, a value which sets the electric field intensity of the signal light to zero). Specifically, if the path of the reference light is relatively and slightly elongated due to the interferometer deviation, the phase of the signal light advances more than that of the reference light as the reference and hence rotates in a negative direction on the phase plane. As a result, the intensity of the in-phase component is changed to a negative value. The controller 125 conducts feedback control as below. When the in-phase component intensity is negative, the controller 125 reduces the delay in the phase shifter 110. When the in-phase component intensity becomes positive, the controller 125 makes the delay longer in the phase shifter 110. The controller 125 hence continuously keeps the path length of the reference light to be substantially equal to that of the signal light to thereby stabilize the output signal from the interferometer. FIG. 4B shows an example in which the phase control is actually conducted. As a result, the in-phase component intensity is substantially kept unchanged (the standard deviation of the phase error is 0.02159 rad), which enables the long-term measurement of the optical electric field.

Figure 5A:
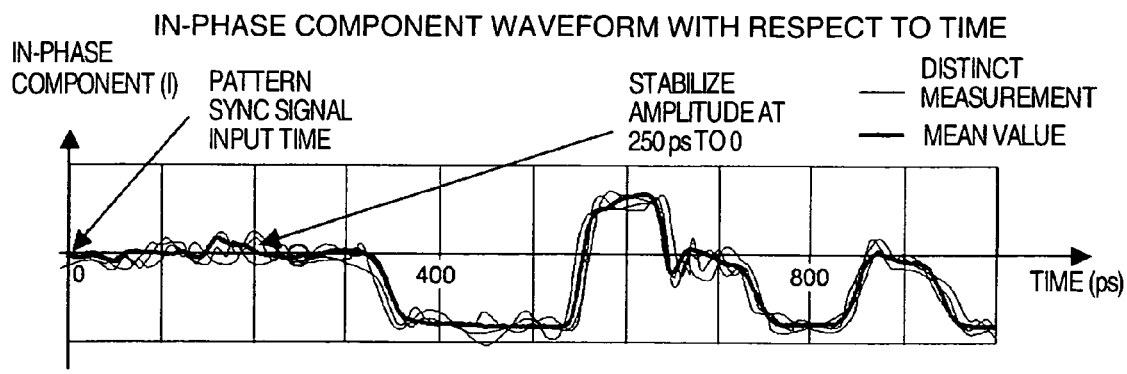
FIG. 5A is a graph showing an optical electric field measurement principle in the first embodiment, specifically showing the waveform of the in-phase component with respect to time.

FIG. 5A shows a high-speed waveform of the in-phase component with respect to time obtained from the sampling oscilloscope 120-2 (effectively equal to that obtained from the oscilloscope 120-1 excepting that the intensity is inversed). In the example, time 0 indicates an input point of time of the pattern sync signal. Setting a point of time about 200 ps (in the vicinity of the bit center) thereafter as a reference point of time, the control operation is conducted such that the intensity is continuously zero. In this method, one information piece of phase deviation is attained each time the symbol pattern is repeated. The repetition period depends on the bit rate and the bit pattern length (for example, ranging from $2^7$=128 bits to $2^{23}$=about 8 million bits). However, in general, the control is possible with an interval of time sufficiently less than the period of the phase deviation. If a symbol pattern with 23-stage PN (Pseudo Noise) at a symbol rate of, for example, ten gigabits per second is employed, 1192 pieces of phase information can be attained during one second. This speed is sufficiently higher than that of the interferometer deviation. To observe the waveform using a longer symbol pattern and a slower bit rate, there may be employed, for example, a method in which a plurality of reference points of time are disposed in one symbol pattern to observe the phase variation at each of the reference points of time.

In the synchronization method, the optical phase is controlled to be fixed at a particular point of time in the symbol pattern of the optical waveform. If the optical signal intensity is not zero and no abrupt phase variation exists at the point of time, the method is applicable in any situation and leads to an advantage that the method is independent of the kind of the modulation code and the modulation pattern. The user may freely set the particular point of time. Or, the measuring apparatus may automatically search a point of time at which the optical signal intensity is not zero and the phase variation rarely occurs to automatically set the point of time as the particular point of time.

In the example, the in-phase component intensity is kept unchanged through the control operation. However, the control may be conducted to keep the quadrature component intensity unchanged. Also, the phase angle of the optical electric field which can be calculated using the in-phase and quadrature components may be kept unchanged. If the control operation is conducted using only the in-phase component, it is not necessarily required to observe the quadrature component.

Figure 5B:
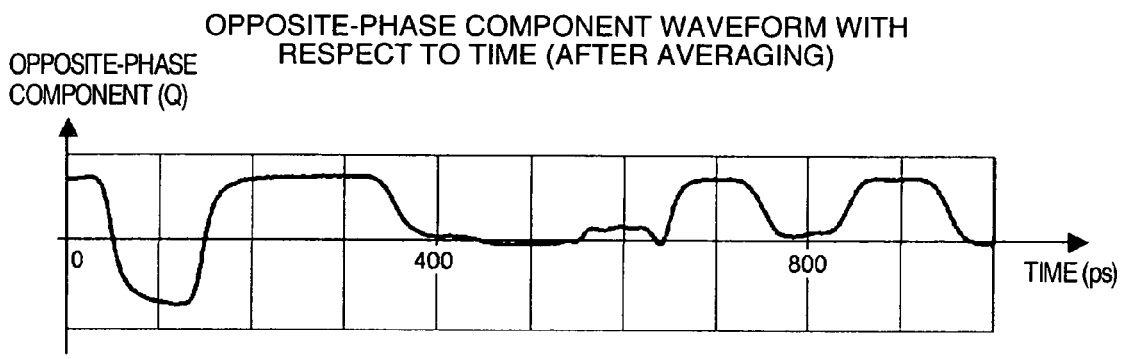
FIG. 5B is a graph showing an optical electric field measurement principle in the first embodiment, specifically showing the waveform of the opposite-phase component with respect to time (after averaging).

On the other hand, in the state after the phase stabilization is conducted for the interferometer as above, the oscilloscope 102-2 measures the intensity of the in-phase component of the optical signal and that of the quadrature component thereof. However, since noise is mixed with the waveform, the results of measurement of the waveform of the in-phase component measured at timing synchronized with the pattern sync signal vary respectively as indicated by thin lines in FIG. 5A although the symbol pattern is kept unchanged. To cope with the situation according to the present invention, the waveform data items measured at timing synchronized with the pattern sync signal are averaged a plurality of times (e.g., 16 times or 64 times) to calculate a mean waveform (as indicated by a solid line) by removing the noise. Since the noise is removed, the distortion of the waveform is mainly associated with the inter-symbol interference of the optical modulator and the modulated signal. FIG. 5B shows the result of the averaging conducted for the waveforms of the quadrature component observed at the same time as above.

The removal of the noise through the averaging is conducted not only at pattern synchronization, but the respective waveforms may be averaged in the direction of time. If it is desired to observe the quantity of noise or to reduce the waveform response time, it is not necessarily required to conduct the averaging. However, it is difficult to evaluate the inter-symbol interference of the waveform.

In general, the average value of the in-phase and quadrature components of the optical electric field is not zero. This is because the inherent zero point for each of the components is the value obtained when the input signal intensity is zero. This corresponds to the mean intensity of the reference light. With the signal light intensity set to zero, the signal levels of the signals obtained from the in-phase and quadrature component output ports 133 and 134 are stored in advance. The measured value of each component is corrected to set the value of the associated signal level to zero. This leads to the correct measurement results.

Figure 5C:
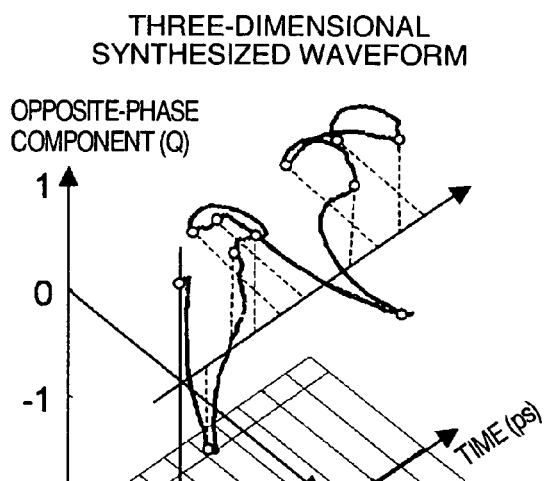
FIG. 5C is a graph showing an optical electric field measurement principle in the first embodiment, specifically showing the three-dimensional synthesized waveform.

FIG. 5C shows an example of the three-dimensional display in a space including a time axis, an in-phase component, and a quadrature component. Specifically, the in-phase component obtained through experiments is synthesized with the quadrature component obtained at the same time to re-construct an optical electric field. FIG. 5C shows 10-bit (1000 ps) data of the QPSK signal and indicates that the mixed optical electric field successively changes its direction with a lapse of time. In FIG. 5C, a small circle indicates a position of the optical electric field at a symbol central time. It can be confirmed that the position is either one of four points expressed as (I,Q)=(1,0), (0,1), (−1,0), (0,−1) in the mutually orthogonal phase space.

Figure 5D:
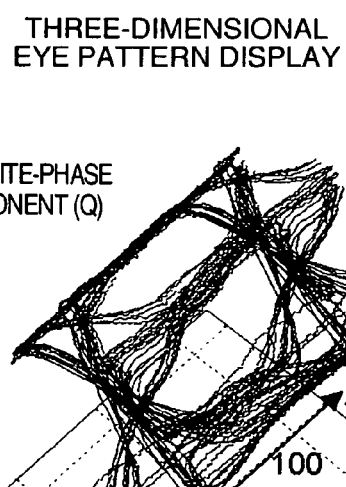
FIG. 5D is a graph showing an optical electric field measurement principle in the first embodiment, specifically showing the three-dimensional eye pattern display.

FIG. 5D shows an example of an eye pattern display in the three-dimensional space in which the optical electric field of 90 bits is folded in the direction of time. Since a large number of optical electric field traces are superimposed onto the eye pattern display, it is advantageous that the state of the inter-symbol interference of the waveform, the magnitude of the timing jitter, and the reflection can be instinctively recognized. The three-dimensional trace and the three-dimensional eye pattern of the electric field of the optical signal can be displayed for the first time only by implementing the electric field waveform measurement with high precision and time high resolution according to the present invention. The waveforms are measured for the respective components in the example as below. As shown in FIGS. 5A and 5B, ten bits are measured in each measurement. The processing, "in which in-phase and quadrature waveforms of ten-bits length are obtained 64 times and are averaged and then the waveform measurement start time is shifted for ten bits", is repeatedly executed nine times to resultantly obtain a 90-bit successive electric field waveform. The observation time is not restricted in principle, and hence a longer-time waveform and a longer-time eye pattern can be observed by repeatedly conducting the same operation.

Figure 6A:
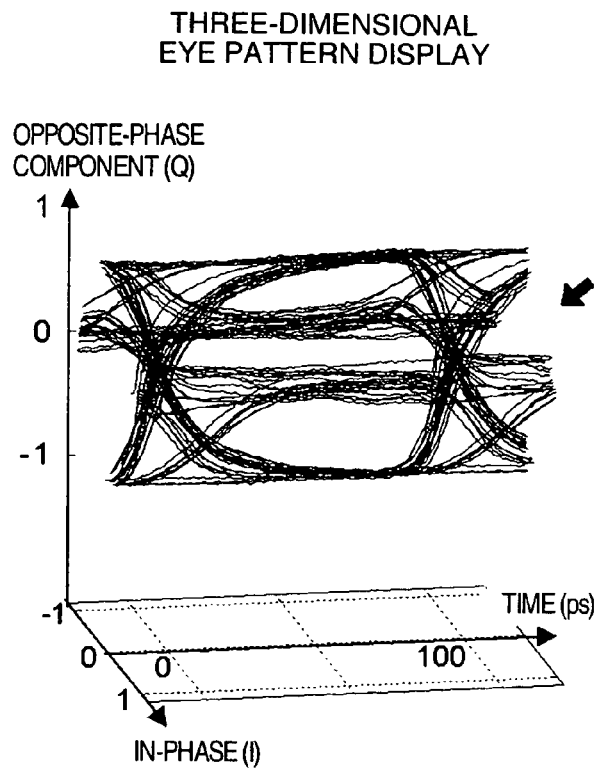
FIG. 6A is a graph showing an example of the three-dimensional display of the optical electric field in the first embodiment, specifically showing the three-dimensional eye pattern display.
Figure 6B:
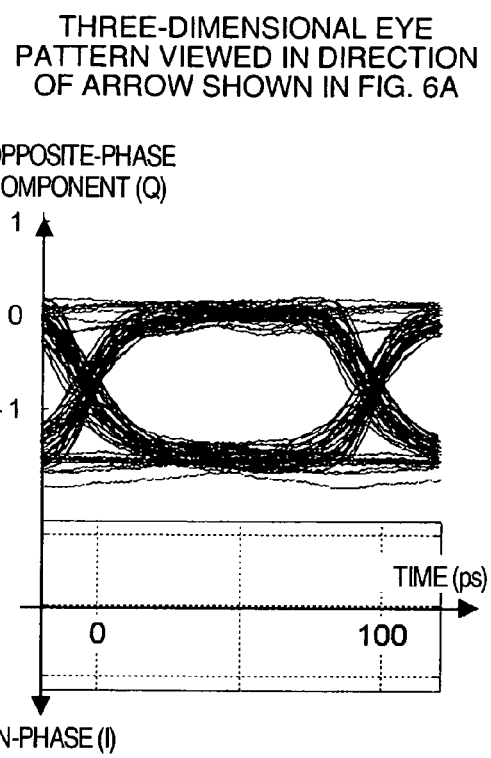
FIG. 6B is a graph showing an example of the three-dimensional display of the optical electric field in the first embodiment, specifically showing the three-dimensional eye pattern display viewed in the direction of an arrow in FIG. 6A.
Figure 6C:
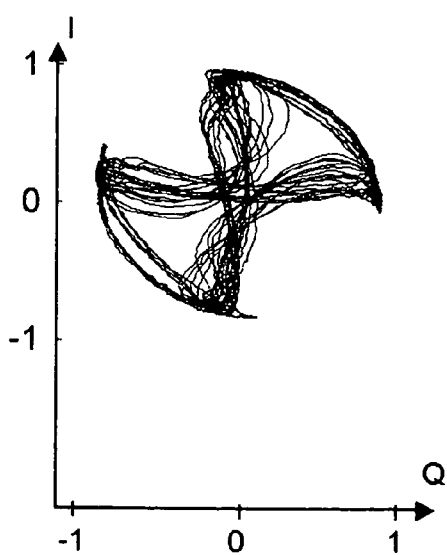
FIG. 6C is a graph showing an example of the three-dimensional display of the optical electric field in the first embodiment, specifically showing the phase plane display.
Figure 6D:
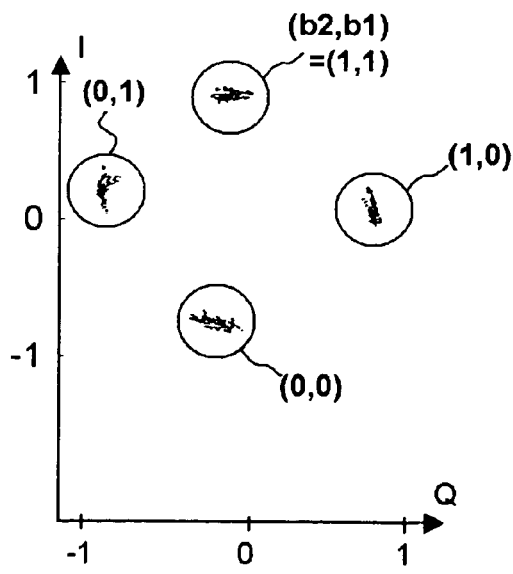
FIG. 6D is a graph showing an example of the three-dimensional display of the optical electric field in the first embodiment, specifically showing the three-dimensional eye pattern display of data from 40 ps to 60 ps.

FIG. 6A shows an example of the three-dimensional eye pattern display (FIG. 5D) viewed in another direction in the three-dimensional space. By arbitrarily changing the observing direction, it is possible, for example, to observe the magnitude of the inter-symbol interference in the phase direction and in the amplitude direction at each phase point. Also, it is possible to easily measure various items such as the size and margin of each plural eye opening. FIG. 6B shows an example in which the waveform of FIG. 6A is observed in an arrow direction (45° in the phase plane, i.e., the direction of vector (I,T,Q)=(−1,−1,0)). It can be seen from FIG. 6B that the phase transition at time 0 ps and time 100 ps is completed in a short period of time (10 ps to 20 ps). It is also possible to determine the quantity of timing jitter at phase transition. FIG. 6C is an example of the waveform of FIG. 5D viewed in the direction of the time axis and shows the optical electric field traces on the phase surface, which are useful for the optimization of the angle of the optical phase modulation and for the evaluation of the quantity of chirp. By changing the observing direction as above, the waveform evaluation which is not possible in the prior art can be easily carried out. FIG. 6D is an example of plotting of the waveform of FIG. 6C. Specifically, data of the waveform during the period of time before and after 20 ps of a waveform identifying time (from 40 ps to 60 ps) is plotted. By displaying the obtained data within a particular range of time, it is possible to instinctively recognize the deviation of the respective phase points and the appropriateness of the allocation of the phase points.

Description has been given of an observation example of the optical QPSK signal. The present invention is applicable to any modulation method. Only for the optical signal using an external modulator, it is possible to employ the phase modulation, the amplitude modulation, the frequency modulation, and a synthesis thereof. The present invention is also applicable to the evaluation of the phase rotation in the intensity modulation and the duo-binary modulation. If the number of signal levels of multi-level modulation is increased or if it is desired to evaluate the waveform after the intensity modulation and the phase modulation, it is effective to employ a method of displaying only the data of a particular amplitude range and a particular angle range.

Figure 7:
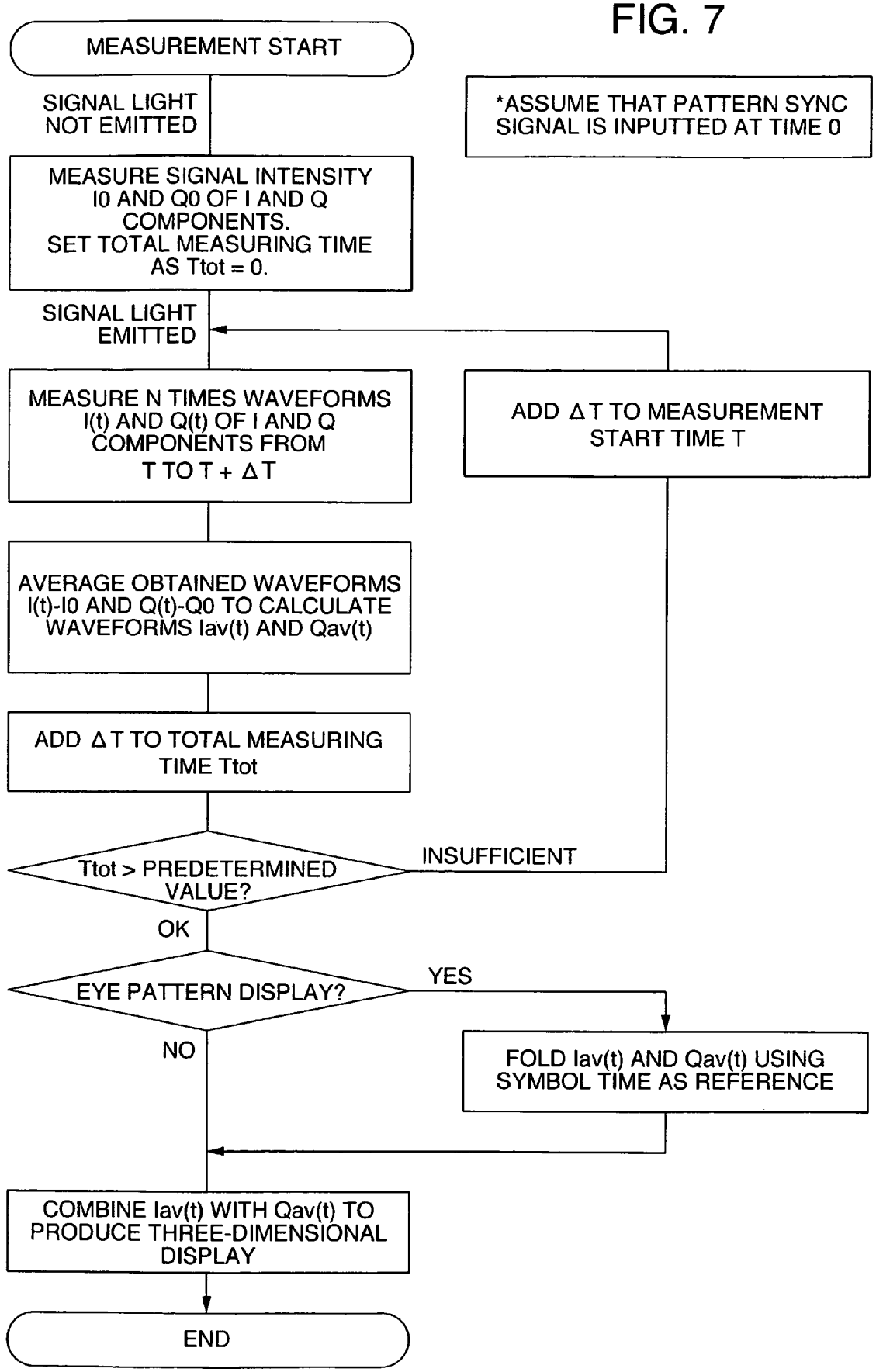
FIG. 7 is a flowchart showing a measuring procedure employed in the first embodiment.
Figure 8:
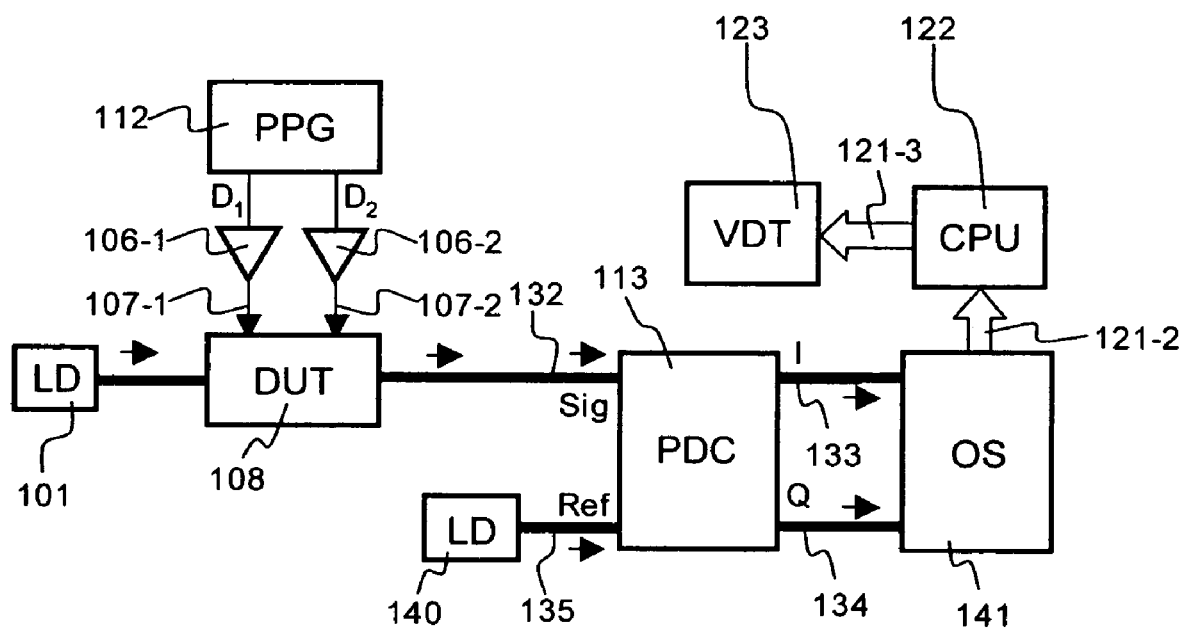
FIG. 8 is a configuration diagram showing a conventional optical phase observing method.
Figure 9A:
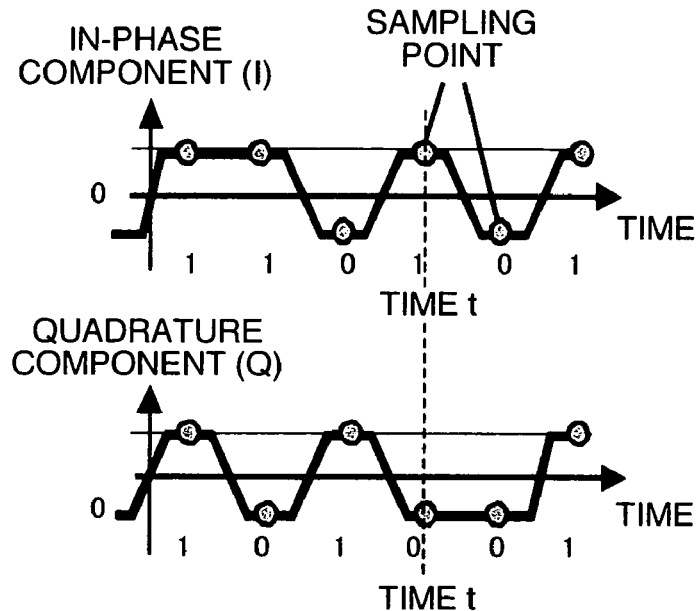
FIG. 9A is graphs to explain optical phase measurement in the conventional optical phase observing method, specifically showing a sampling example of in-phase and quadrature components of the received optical electric field.
Figure 9B:
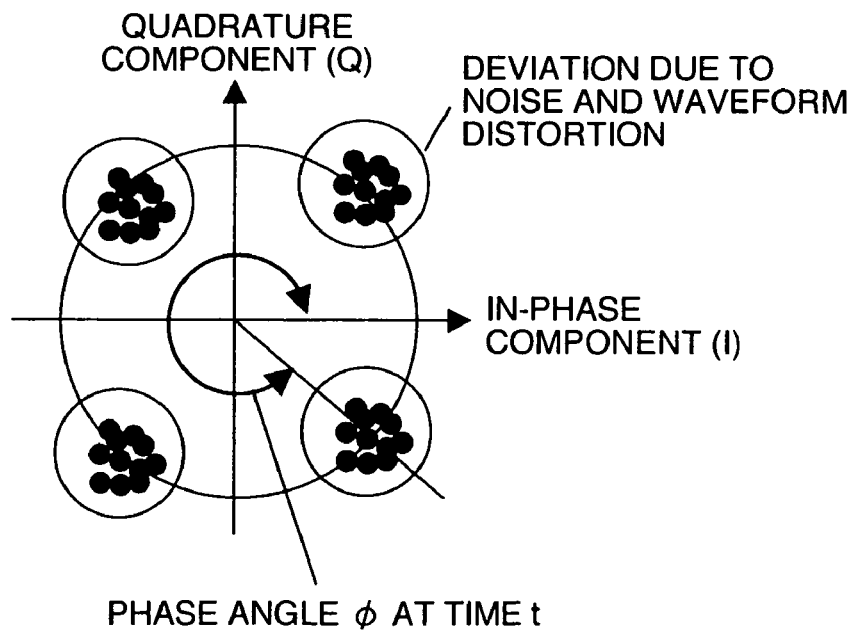
FIG. 9B is graphs to explain optical phase measurement in the conventional optical phase observing method, specifically showing data plotted on the phase plane.

FIG. 7 shows an example of a measuring procedure in the first embodiment of the present invention. After the measurement is started, in a state in which the signal light is not emitted, the intensity values I0 and Q0 respectively of the in-phase and quadrature components are measured, and the values are stored as the zero reference values. Thereafter, the light signal is emitted. Time 0 is set as an input point of time of the pattern sync signal.

First, the waveforms I(t) and Q(t) respectively of the in-phase and quadrature components from T to T+ΔT are measured N times. After I0 and Q0 are subtracted respectively from these waveforms to conduct a zero-level correction, the averaging is carried out to attain the mean waveforms Iav(t) and Qav(t) of the respective components between time T and time T+ΔT. The total measuring time is ΔT. If this is less than a predetermined period of time, the measurement start time T is shifted to a delayed point of time by ΔT. The measurement is repeatedly carried out until the total measuring time reaches the predetermined time. If the eye pattern display is required, the waveforms are folded in the symbol time unit to finally synthesize Iav(t) and Qav(t) to produce the three-dimensional display, thereby completing the waveform display. To average the optical electric field waveform for an angle, amplitude, and each vector; I(t) and Q(t) are vector-wise synthesized each other to thereafter conduct the averaging according to necessity.

Second Embodiment

Figure 10:
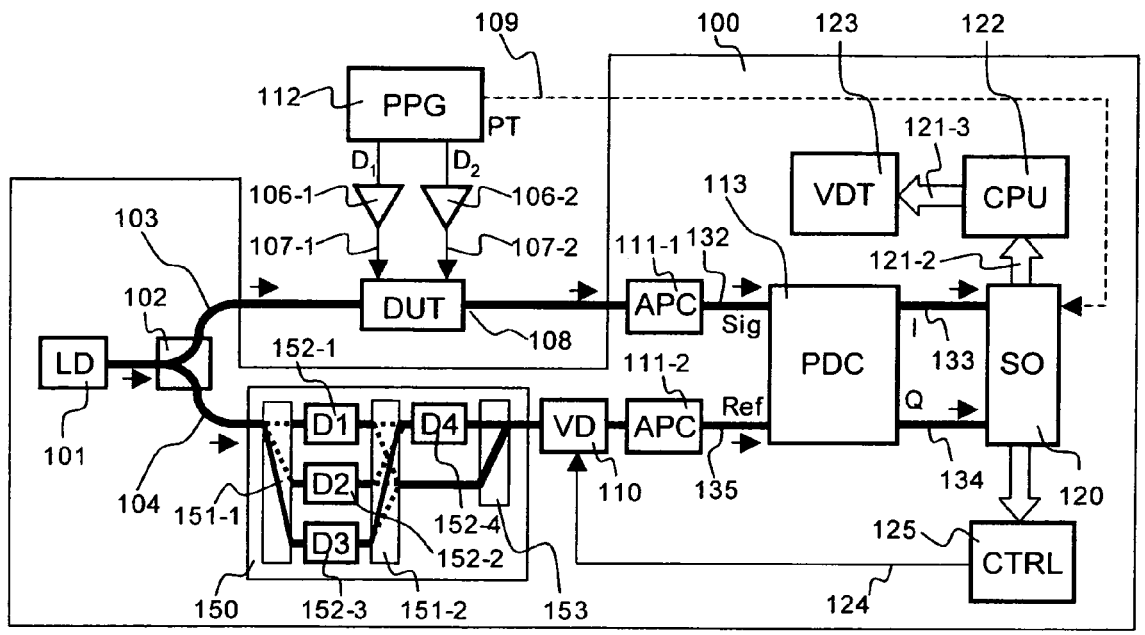
FIG. 10 is a configuration diagram showing a second embodiment of the present invention.

FIG. 10 shows a configuration of the second embodiment of the present invention. This is an example in which the waveform measuring apparatus 100 includes the laser source 101 and the optical coupler 102. The waveform measuring apparatus of the present invention may be configured such that part of the constituent components are externally arranged or internally disposed in the apparatus according to necessity.

Also, in this example, the optical fiber delay line 105 of FIG. 1 is replaced with a variable optical delay circuit 150 and only one optical input sampling oscilloscope is employed to observe the optical signal. The delay circuit 150 includes optical switches 151-1 and 151-2 to change a path of the optical signal, fixed optical fiber delay lines 152-1 to 152-4 to delay the optical signal for a predetermined period of time, and an optical coupler 153 to synthesize optical signal paths into one path. In the example, the delay lines 152-1 to 152-4 have respectively lengths of 150 cm, 90 cm, 30 cm, and 180 cm. In the configuration, the reference light is fed via the optical switch 151-1 to either one of the delay lines 152-1 to 152-3. Output light therefrom is delivered via the optical switch 152-2 to the delay line 152-4 or a path not including a delay line. The light is then returned via the optical coupler 153 to the reference light path. As a result, the quantity of delay of the delay circuit 150 stepwise changes from 30 cm to 330 cm with a step of 60 centimeters. Even if the length of the optical modulator as a measurement object is varied to a maximum length of 330 cm in the example, the path length difference can be limited to 30 cm by changing the quantity of delay of the delay circuit 150 to thereby measure the electric field waveform in a stable state. The minimum value of the delay line and the unit of delay change depending on the line width of the laser source, the signal processing method, and the precision of measurement required in the measuring system. The value and the unit may be set to, for example, a value from several centimeters to several meters according to necessity. The example includes a two-stage optical switch configuration. The configuration is not restricted only if the quantity of delay can be freely changed. According to necessity, various configurations may be employed, for example, the number of stages of switches may be increased or connectors are employed in place of optical switches such that optical fiber delay lines are manually connected to each other using the connectors to thereby change the quantity of delay. There may also be employed a configuration of the variable optical delay circuit in which a reflection mirror and an optical collimator are successively moved. If the reference light path is disposed for a sufficiently long distance, the variable optical delay circuit may be arranged on the signal line path.

When the signal light intensity varies due to the variation in the quantity of delay, it is likely to cause an error in the measurement of the optical electric field. There can be hence considered according to necessity a configuration additionally including an attenuator or an optical amplifier to keep the optical intensity unchanged or a correction circuit to measure and to correct the reference light intensity.

In the second embodiment, one optical input sampling oscilloscope 120 is employed to stabilize the interferometer and to measure the optical waveform as described above. In the example, the oscilloscope receives a synchronizing signal and then measures the in-phase component at the reference time to notify the in-phase component to the controller 125. The controller 125 achieves a feedback control operation for the variable optical phase shifter 110 to keep the in-phase component intensity unchanged. Thereafter, the delay time is changed in the oscilloscope 120, and then the waveforms of the in-phase and quadrature components are acquired to observe the optical electric field waveform within a required time range. The period of time required to change the measuring time in this method is sufficiently shorter than the time of deviation (several hertz) of the interferometer.

Third Embodiment

Figure 11:
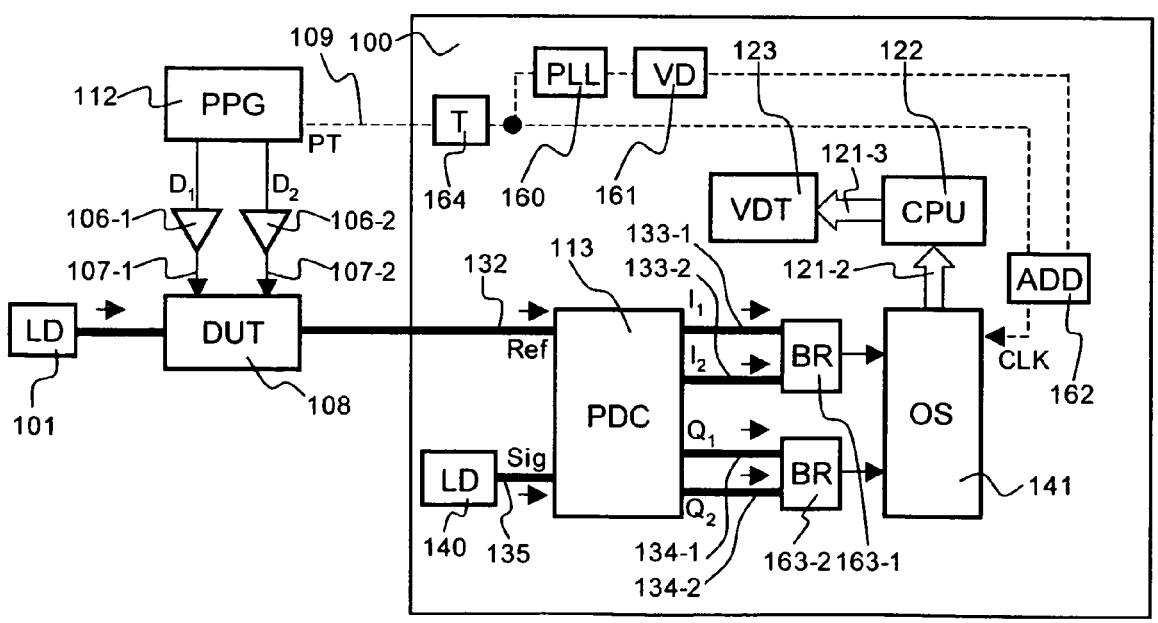
FIG. 11 is a configuration diagram showing a third embodiment of the present invention.

FIG. 11 shows a configuration of the third embodiment of the present invention. The example includes a homodyne interferometer configuration in which local emission is employed in place of the self-homodyne optical interferometer and the waveform observing apparatus 100 is configured using the digital phase diversity method. The interference method using such local emission source is advantageous in that the measurement of the optical electric field waveform is possible for an integrated light source including an external modulator and a laser source and for the optical waveform including phase deviation after transmission through the optical fiber for which delay adjustment is difficult. In the conventional digital phase diversity method described above, there exists a problem as follows. It is not possible to conduct the waveform observation with high precision and with high time resolution. Moreover, there does not exist the phase reference of the waveform and hence the long-term measurement is not possible. In the example, by appropriately processing a pattern sync signal (or PT: Pattern trigger) 109, the calculation of the phase reference and the high-precision measurement of the waveform can be achieved using the optical signal.

FIG. 12A shows a phase reference signal obtained by delaying the pattern sync signal 109 from the pulse pattern generator 112 by an electric delay circuit 164 for a period of time T. Assume that the phase reference signal falls down to zero at a point of time after a reference period of time T relative to the first point of the symbol pattern. The signal is divided into a first portion and a second portion. The first portion is multiplied by the number of bits (e.g., 128 bits) of the symbol pattern in the phase synchronization multiplier circuit (Phase Locked Loop (PLL) multiplier circuit) 160 to be converted into a synthesized clock signal with a symbol rate substantially equal to the symbol rate of the optical modulation waveform. The signal is then delayed by an electric variable phase shifter 161 for a predetermined period of time D. If the falling edge is assumed as the reference, the waveform of the clock signal is as shown in FIG. 12B. The synthesized clock signal (CLK) is synthesized by a clock synthesizing circuit 162 with the phase reference signal of FIG. 12A to be converted into a synthesized sampling clock shown in FIG. 12C. The waveform is obtained by superimposing the phase reference signal onto the synthesized clock signal and is adjusted such that the interval of falling points of time of the signal waveform is equal to or more than the minimum sampling interval of time of the high-speed oscilloscope 141. As a result, when the quantity of delay of the phase shifter 161 is changed from D to D', the synthesized sampling clock is as shown in FIG. 12E. While keeping the phase reference time T unchanged, only the sampling time can be changed.

By using the synthesized sampling signal as its sampling signal, the oscilloscope 141 samples the waveform at a falling point thereof and sequentially stores results of the measurement in a memory disposed in the oscilloscope 141. FIG. 12D is a first measurement example in which the in-phase component of the optical electric field is sampled by setting the quantity of delay of the phase shifter 161 to D. FIG. 12F is a second measurement example of the similar sampling operation conducted by setting the quantity of delay of the phase shifter 161 to D'. For both measurement results, the phase reference time T is kept unchanged. The variation in the intensity of the optical signal at the point of time is caused by the deviation of the phase between the local light and the signal light (or noise of the optical signal). The noise component can be removed by averaging a plurality of measurement results. By synthesizing the measurement results of the in-phase and quadrature components each other, the phase angle of the optical electric field at the phase reference time T is calculated. Thereafter, the phase angle is measured using the value of the phase angle as the reference phase. As a result, it is possible to remove the influence of the phase deviation of the light source. For this purpose, the reference phase angle is subtracted from the phase angle of the waveform at each point. Resultantly, the optical electric field can be measured in a stable state in any situation also in the digital phase diversity method. Unlike in the conventional example in which the variation in the phase angle of the optical signal is followed for the estimation, the phase of the optical signal at the particular reference time is set as "reference phase" in any situation. Therefore, even in a case in which the memory in the oscilloscope is full of data and the processing is interrupted to transmit data therefrom to the CPU 122 and the processing is resumed thereafter, the phase reference is kept retained and hence the data can be continuously acquired for a long period of time.

After this point, the measurement is conducted while gradually changing the quantity of delay D in a unit, the unit being one over several tens of the symbol length. The optical electric field waveform can be measured with high time resolution. Through the operation in which the waveform measurement is conducted plural times with the quantity of delay D kept unchanged and the measurement results are averaged to remove the noise component, it is possible to acquire the electric field waveform with high precision. Thereafter, the waveform combining operation and the display processing can be carried out in almost the same way as for the embodiments described above.

Although the optical waveform observing apparatus 100 according to the example internally creates the clock signal using the pattern sync signal 109 received as an input signal, it is also possible to directly receive such clock signal from an external device. There may be employed a configuration in which a clock signal is received as an input signal such that the signal is divided by an internal counter according to the number of bits of the symbol pattern to thereby create a pattern sync signal. As described above, it is also possible that by intentionally disposing a particular point of time, for example, in the symbol pattern at which the signal light is not modulated, the phase angle of the optical electric field is measured by using, as the reference, the phase angle of the optical electric field at the time. It is not necessarily required that both data items respectively of the phase reference and the waveform are obtained by one and the same high-speed oscilloscope. Since the function of the oscilloscope can be achieved also by, for example, an optical receiver and a high-speed A/D converter, almost the entire function or part thereof may be replaced by these circuits according to necessity. Particularly, for the phase reference, it is possible to acquire data at a low speed. Therefore, the configuration may be implemented using, for example, an optical receiver and an electric signal sampler. There may also be employed a method in which the optical electric field waveform is measured by an optical sampling oscilloscope to transfer obtained waveform data to the CPU to thereafter correct the phase of the point of time at which the waveform is acquired.

In FIG. 11, in the optical signal measurement, two balance-type optical receivers 163-1 and 163-2 are used to cancel the direct-current (dc) component in the signal, and hence the zero correction of amplitude is not required. Two in-phase port signals 133-1 and 133-2 from the phase diversity circuit 113 are inputted to the optical receiver 163-1. Two quadrature port signals 134-1 and 134-2 from the phase diversity circuit 113 are inputted to the optical receiver 163-2. The balance-type optical receiver outputs an electric signal indicating the difference in intensity between two input optical signals. The optical signals fed to two in-phase ports are mutually inverted in amplitude and are substantially equal in the dc component. Therefore, the configuration leads to an advantage that the dc component is automatically removed and the zero correction of the electric field is not required.

Fourth Embodiment

Figure 13:
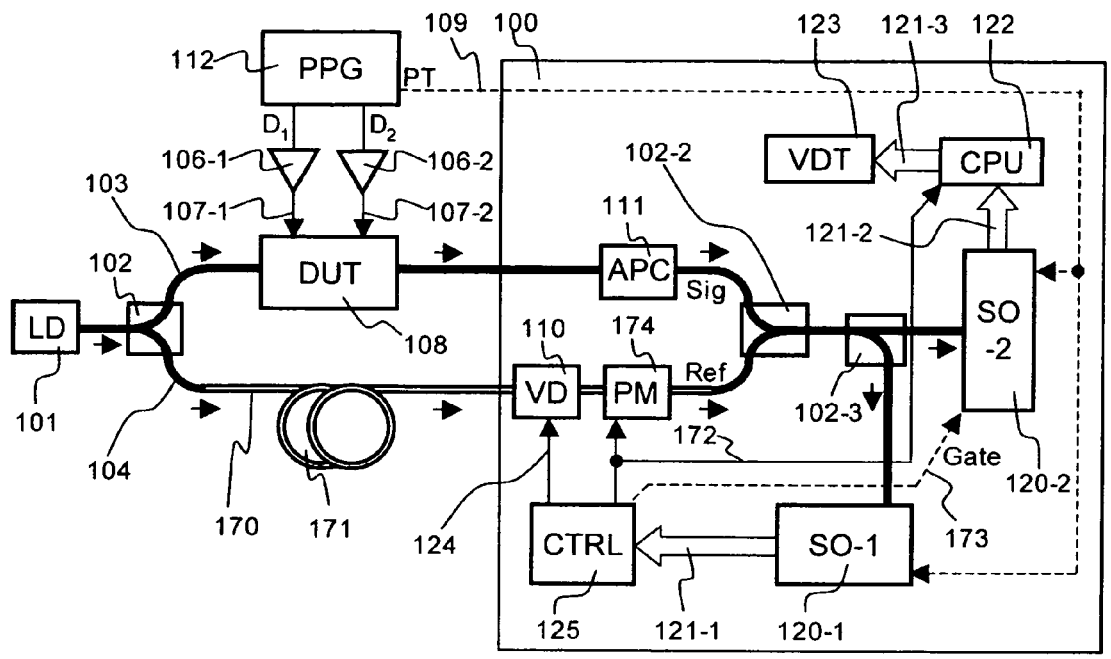
FIG. 13 is a configuration diagram showing a fourth embodiment of the present invention.

FIG. 13 shows a configuration of the fourth embodiment of the present invention. In this example, the reference light path is constructed using a polarization holding optical fiber 170 and a polarization holding optical fiber delay line 171. Therefore, even if the state of bending of the optical fiber and the temperature thereof are changed, the polarization state of the reference light is not changed. It is hence not required to dispose a polarization control mechanism such as an automatic polarization controller of the reference light path. Such advantage is attainable also by configuring the reference light path using a space optical system and a waveguide path. The polarization holding of this kind is broadly applicable also to the signal light path as well as to the other embodiments of the present invention.

In the fourth embodiment, the optical multiplexing section of the self-homodyne interferometer includes an optical coupler 102-2 in place of the phase diversity circuit. The polarization controller 111 adjusts the polarization state of the signal light to match the polarization state between the reference light and the signal light to cause homodyne interference therebetween with maximum efficiency. The optical coupler 102-3 is employed to divide the output signal from the interferometer into two signals to be fed to the optical input sampling oscilloscopes 120-1 and 120-2. When the phase diversity circuit is not used as in the example, it is difficult to simultaneously observe the in-phase and quadrature components. To cope with the difficulty, a phase modulator 174 is arranged on the reference light path so that a phase delay of 0° or 90° is applied to the reference light by an in-phase•quadrature switching signal 172 from the controller 125. Resultantly, the oscilloscopes can observe the in-phase component of the optical electric field when the phase delay is 0° and the quadrature component thereof when the phase delay is 90°. The signal 172 is also supplied to the CPU 122. Therefore, it is possible to determine whether the waveform attained from the oscilloscope 120-2 is the in-phase component or the quadrature component. If a two-by-two optical coupler is employed as the optical coupler 102-2, the two optical output ports output two optical output signals mutually inverted in the sign. It is therefore possible as in the above embodiments to use an optical balance-type receiver.

The phase modulator 174 and the variable optical phase shifter 110 are units which apply a delay of variable length to an optical signal in principle. Therefore, the functions thereof may be integrally implemented by one unit. The automatic polarization controller 111 arranged on the reference light path has degrees of freedom to control the direction of polarization of the signal light and the phase thereof in many cases. It is hence possible in the example, that the phase shifter 110 and the phase modulator 174 are removed such that all functions thereof are implemented by one automatic polarization controller. In the situation, the automatic polarization controller 111 receives as inputs thereto a control signal 124 and the in-phase•quadrature switching signal 172 from the controller 125 to be externally controlled according to the signals 124 and 172.

The interferometer using an optical coupler of the fourth embodiment is applicable also to the other embodiments including the interferometer of homodyne type using a local light source. Any configuration of the interferometer is available only if the optical electric field can be detected. There may be employed, for example, a configuration to cause the self-homodyne interference by separating the remaining carriers from the signal light by a narrow-band filter, a configuration in which the reference signal is transmitted through the path of the signal light using polarization orthogonal to the signal light, and a configuration including an integrated interferometer including a synthesis of the in-phase component detecting interferometer and the quadrature component detecting interferometer employed in "Direct Measurement of Constellation Diagrams of Optical Sources" described above. It is also possible to employ a heterodyne interferometer configuration in which the frequency of the reference light is intentionally shifted from that of the signal light by a predetermined value. In this situation, the measured optical electric field is corrected according to the frequency shift.

As the variable optical phase shifter 110 in the present invention, there may be employed a fiber phase shifter which varies the quantity of delay by elongating the optical fiber using the piezoelectric effect and a phase shifter which moves the position of a mirror according to the piezoelectric effect. These phase shifter corrects the variation in the path length of the optical and reference signals due to the temperature or the like. Therefore, it is favorable to successively vary the quantity of delay in a range from several tens of microns to several millimeters (several tens of $\pi$ to several thousands of $\pi$ in terms of optical phase). For the optical homodyne interferometer to detect the optical electric field in a stable state, it is necessary that the fraction obtained by dividing the phase difference between the paths by $2\pi$ is kept unchanged with high precision. The same output signal is obtained even if there takes place the difference which is expressed as an integral multiple of $2\pi$. Therefore, it is possible in the present invention to employ as the variable phase shifter a phase shifter of which the maximum quantity of shift is only $2\pi$. In this configuration, the controller 125 operates such that only the fraction of the phase difference is a predetermined value (e.g., zero) in any situation. If the quantity of phase shift set to the phase shifter 110 is beyond its variable range, $n \times 2\pi$ (n is a positive integer) is subtracted from the phase shift quantity so that the stabilizing operation is continuously conducted only for the fractional part less than $2\pi$. However, there arises a problem that the electric field waveform cannot be correctly measured during the subtraction of the phase shift quantity of the variable phase shifter. This can be solved, for example, as below. The subtraction is carried out at a sufficiently high speed in consideration of the waveform averaging time. Or, as can be seen from FIG. 13, the control circuit 125 supplies a gate signal 173 to the oscilloscope 120-2 to inhibit the waveform measurement during the subtraction.

It is also possible to employ a method in which the phase control signal 124 is fed back to the laser source 101 to vary the oscillation wavelength of the laser source to resultantly stabilize the interferometer. This leads to an advantage that the optical variable phase shifter is not required. Also in the interference method using the local emission as described in conjunction with the other embodiments, it is possible to employ an optical PLL configuration in which feedback stabilization is conducted for the signal source or the local emission source such that the observed reference phase continuously takes a fixed value.

Fifth Embodiment

Figure 14:
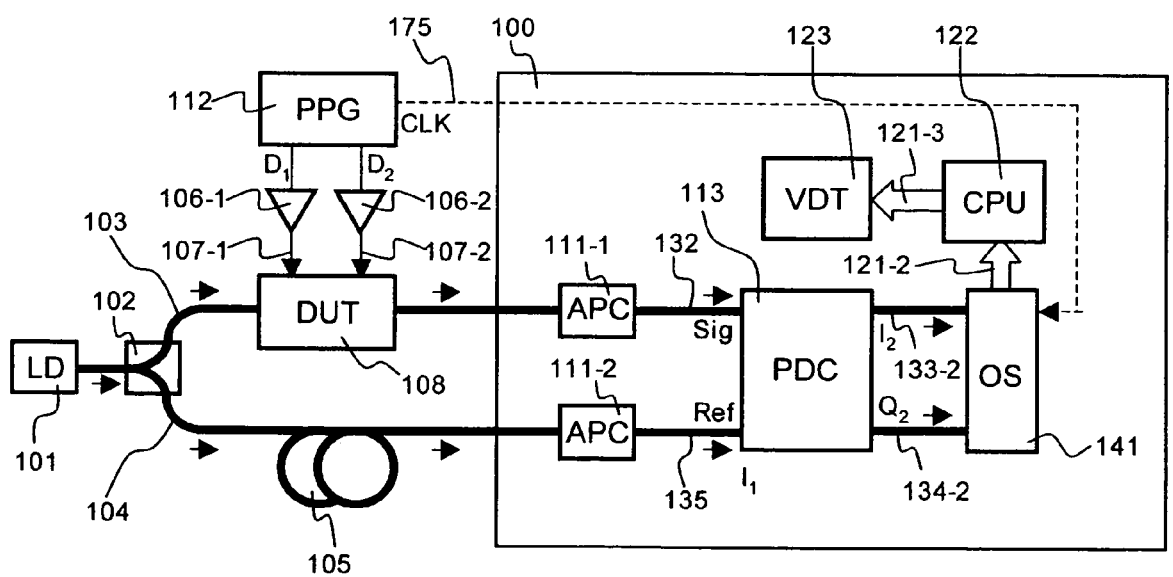
FIG. 14 is a configuration diagram showing a fifth embodiment of the present invention.

FIG. 14 shows a configuration of the fifth embodiment of the present invention. The reference number 175 is a clock signal. In the example, the self-homodyne interferometer is synthesized with the digital phase diversity method. When the self-homodyne interferometer is employed, the local emission is not required and the deviation time of the optical phase can be reduced to be similar to that of the interferometer (down to several tens of hertz). On the other hand, according to the digital-phase diversity method, the optical signal phase measured at timing synchronized with the symbol pattern is used as the reference phase to thereby measure the optical phase. This leads to an advantage that the phase stabilization of the interferometer is not required. In the present method, even if the path difference between the reference light and the signal light is increased to be equal to or more than ten meters and the phase deviation becomes large, the phase deviation can be removed in the high-speed phase diversity method. Consequently, the adjustment of length of the optical fiber delay line 105 is not required. Even if the phase deviation at the measuring point is increased to some extent, the phase deviation component can be efficiently removed from the measurement results by independently averaging the phase angle values and the amplitude values at each sampling point in the respective way according to the present invention.

Sixth Embodiment

Figure 15:
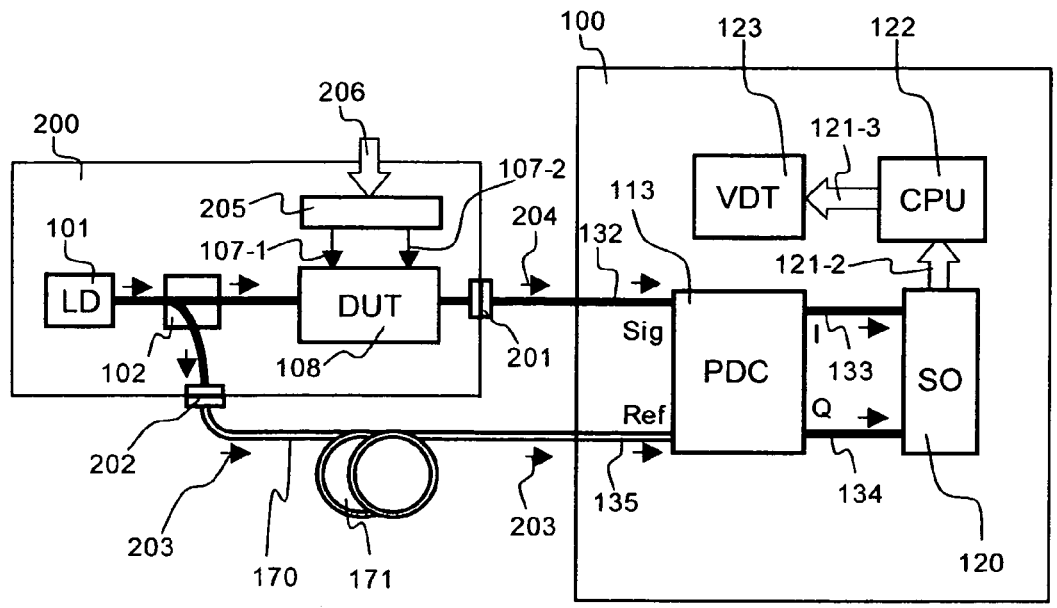
FIG. 15 is a configuration diagram showing a sixth embodiment of the present invention.

FIG. 15 shows a configuration of the sixth embodiment of the present invention. In the configuration of the example, an optical transmitter 200 of the present invention is synthesized with the optical waveform measuring apparatus 100 of the present invention to thereby measure the output waveform of modulated light 204 outputted from the optical transmitter 200. When the self-homodyne interference is employed to observe the electric field waveform according to the present invention, it is required that the modulated light interferes with the reference light not modulated. Therefore, it is in general difficult to measure the waveform after the optical transmitter is assembled. In the example, the optical coupler 102 is arranged immediately after the laser source 101. Part of the output light not modulated is fed to be beforehand outputted as reference light 203 from a reference light output port 202. The optical modulator 108, to which a driver signal obtained by encoding an information signal 100 by an encoder 205 is being applied, modulates the non-modulated light obtained from the optical coupler 102 using the information signal 206 to output a modulated signal 204 from a reference light output port 201. The optical electric field waveform measuring apparatus 100 of the present invention is connected via the modulated light output port 201 and the reference light output port 202 to the optical transmitter 200 to cause therein self-homodyne interference between the modulated light 204 and the reference light 203 respectively therefrom. In the configuration, the electric field waveform can be easily measured even after the optical transmitter is assembled.

Although the optical coupler 102 is employed to draw the reference light in the example, any other device may be employed only if the device includes a function to acquire part of the non-modulated light when the optical waveform is evaluated. There may be used, for example, a configuration in which a variable division ratio optical coupler is employed to draw the non-modulated light only at waveform measurement and a configuration in which the non-modulated light is drawn from an opposite end surface of the laser source 101, the surface opposing the laser emitting surface.

In a general optical transmitter, low-frequency modulation with a frequency ranging from several tens of kilohertz to several megahertz is applied to the laser source 101 to suppress the Stimulated Brillouin Scattering (SBS) which is a kind of the nonlinear effect of the optical fiber or to identify a channel. There may be disposed a function in which if the modulation hinders the measurement, the low-frequency modulation is stopped during the measurement of the optical electric field waveform.

The waveform synchronizing function and the like have not been explicitly described in conjunction with the example. However, the waveform measurement is possible, for example, using a method in which the external information signal is used as the repetitive pattern to obtain a sync signal synchronized with the external information signal or a method in which waveform data is attained in a short period of time without conducting the averaging operation.

Seventh Embodiment

Figure 16:
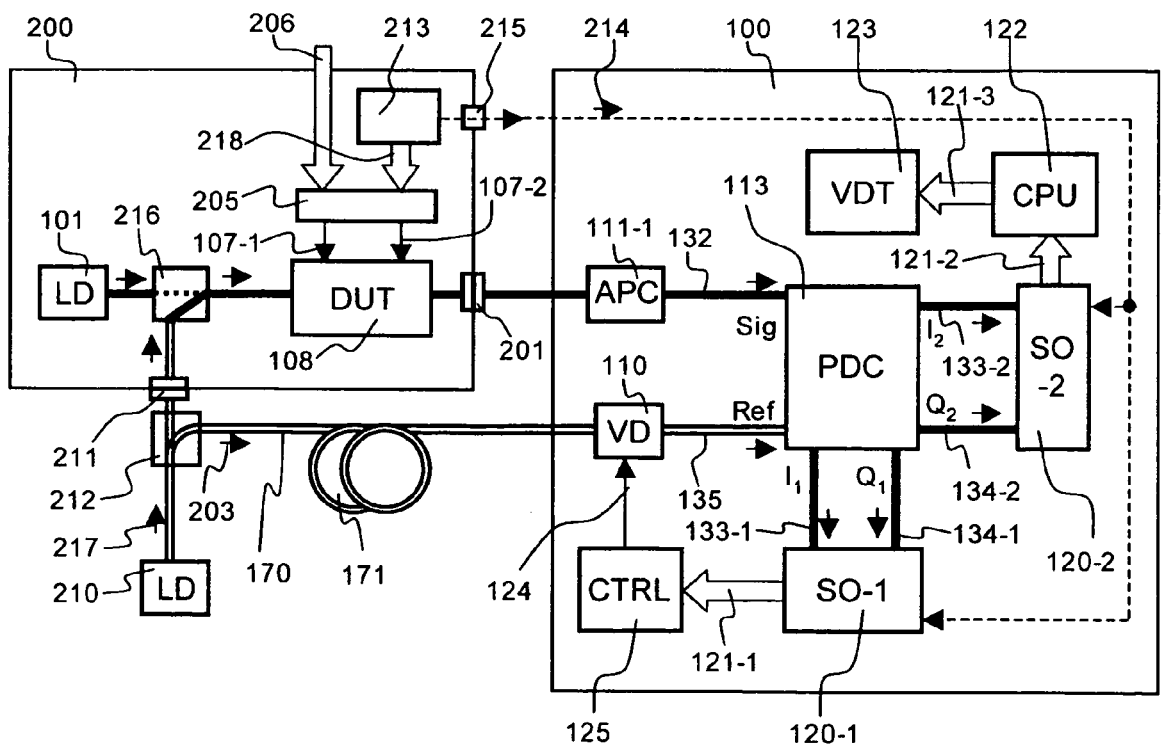
FIG. 16 is a configuration diagram showing a seventh embodiment of the present invention.

FIG. 16 shows a configuration of the seventh embodiment. Also in the embodiment, the optical transmitter 200 of the present invention is synthesized with the optical waveform measuring apparatus 100 of the present invention to measure the output waveform. The sixth embodiment is an example in which the laser source 101 in the optical transmitter is used for the self-homodyne interference. However, there exists a case in which the waveform cannot be measured with sufficient precision because of insufficient coherency or insufficient power of the light source. The seventh embodiment is an example in which a two-by-one optical switch 216 is arranged immediately after the laser source 101 so that the optical electric field waveform is measured through the self-homodyne interference using the external light source. In an ordinary state of operation of the optical transmitter, the two-by-one optical switch 216 is set such that the output light from the laser source 101 is fed to the optical modulator 108. At evaluation of the optical waveform, the state of the switch 216 is changed in order that non-modulated light 217 inputted from an external device to a non-modulated light input port 211 is modulated by the optical modulator 108 and the modulated light is outputted from a modulated light output port 201. On the other hand, a high-intensity, narrow-line-width laser source 210 is externally arranged to output the non-modulated light 217. The light 217 is divided by a polarization holding coupler 212 to draw a first portion and a second portion. The first portion is inputted from the non-modulated light input port 211 to the optical transmitter 200. The second portion is passes as the reference light through the polarization holding optical fiber 170 and the polarization holding optical fiber delay line 171 to be supplied to the optical waveform measuring apparatus 100 of the present invention. In the configuration, the waveform measurement can be appropriately carried out using the external light source only during the waveform measurement.

In the example, a repetitive symbol generator 213 is disposed in the optical transmitter 200 to generate a repetitive symbol pattern 218. A trigger signal 214 synchronized with the repetitive period of the symbol pattern 218 is outputted from a trigger signal output port 215. An encoder 205 conducts a changeover to receive the repetitive symbol pattern 218 as an input thereto only during the optical waveform measurement so that the optical modulator 108 conducts the modulation using the repetitive pattern. The optical waveform measuring apparatus 100 measures the waveform and stabilizes the interferometer at timing synchronized with the trigger signal 214 inputted thereto. This enables the high-precision waveform measurement as in the embodiments described above.

The foregoing describes an example in which the narrow-line-width laser source 210 is externally arranged. However, the laser source 210 may be disposed in the optical waveform measuring apparatus 100 of the present invention. Also, the output light from the light source 210 is substantially entirely connected via the polarization holding fiber to the optical transmitter, and hence it is not required to adjust the polarization state. However, there may be employed a configuration in which an ordinary optical fiber is used for the connection and an automatic polarization controller or a manual polarization controller is arranged according to necessity.

Eighth Embodiment

Figure 17:
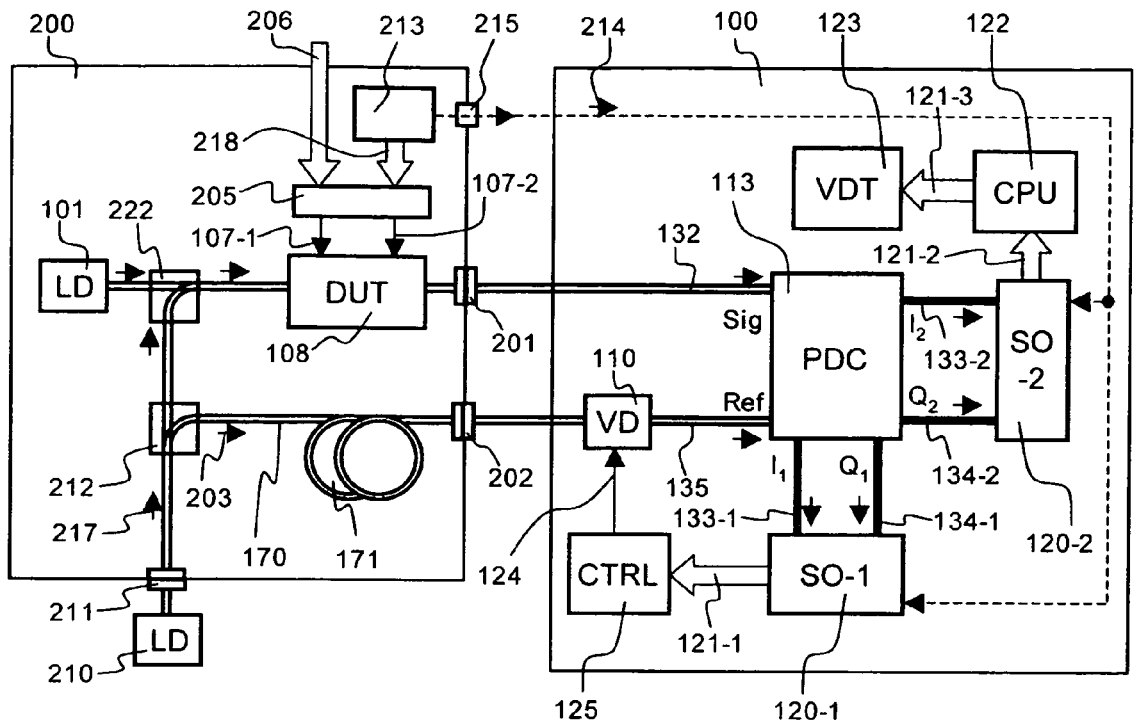
FIG. 17 is a configuration diagram showing an eighth embodiment of the present invention.

FIG. 17 shows a configuration of the eighth embodiment of the present invention. Also in the example, the optical transmitter 200 of the present invention is synthesized with the optical waveform measuring apparatus 100 of the present invention to measure the output waveform. In the example, the external narrow-line-width laser source 210 is employed as the light source for the waveform measurement of the present invention. The polarization holding coupler 212 to draw the reference light and the polarization holding optical fiber 170 and the polarization holding optical delay line 171 which are the path of the reference light are disposed in the optical transmitter 200. In general, it is difficult to appropriately control the optical modulator 108 and the lengths of optical fibers disposed before and after the optical modulator 108. It is likely that the lengths considerably vary depending on a connection error of the optical fibers in the production stage and the length of a fiber pigtail of each optical modulator. To overcome the difficulty, the length of the optical fiber delay line is beforehand adjusted for each of the plural optical transmitters such that the length of the optical path from the polarization holding coupler 212 to the reference light output port 202 and that of the optical path from the coupler 212 to the modulated light output port 201 are equal to or less than one half of the coherent length of the laser source 210. As a result, in the optical waveform measurement of the present invention, it is not required to adjust the path length of the reference light for each of the plural optical transmitters. The optical waveform can be simply conducted according to necessity, for example, after the assembly of the optical transmitter and after the mounting thereof onto a transmitting apparatus.

In the eighth embodiment, the two-by-one optical coupler 222 is disposed between the laser source 101 and the optical modulator 108 to input the non-modulated light 217 therefrom to the optical modulator 108. In operation, the output light from the laser source 101 is simultaneously inputted to the optical modulator 108. If the wavelength of the external laser source 210 is different from that of the laser source 101, no interference occurs therebetween. This reduces influence of the interference onto the waveform measurement. If such influence is still present in the waveform measurement, there will be favorably disposed a function in which the output from the laser source 101 is interrupted during the waveform measurement or a function to remarkably change the wavelength.

Ninth Embodiment

Figure 18:
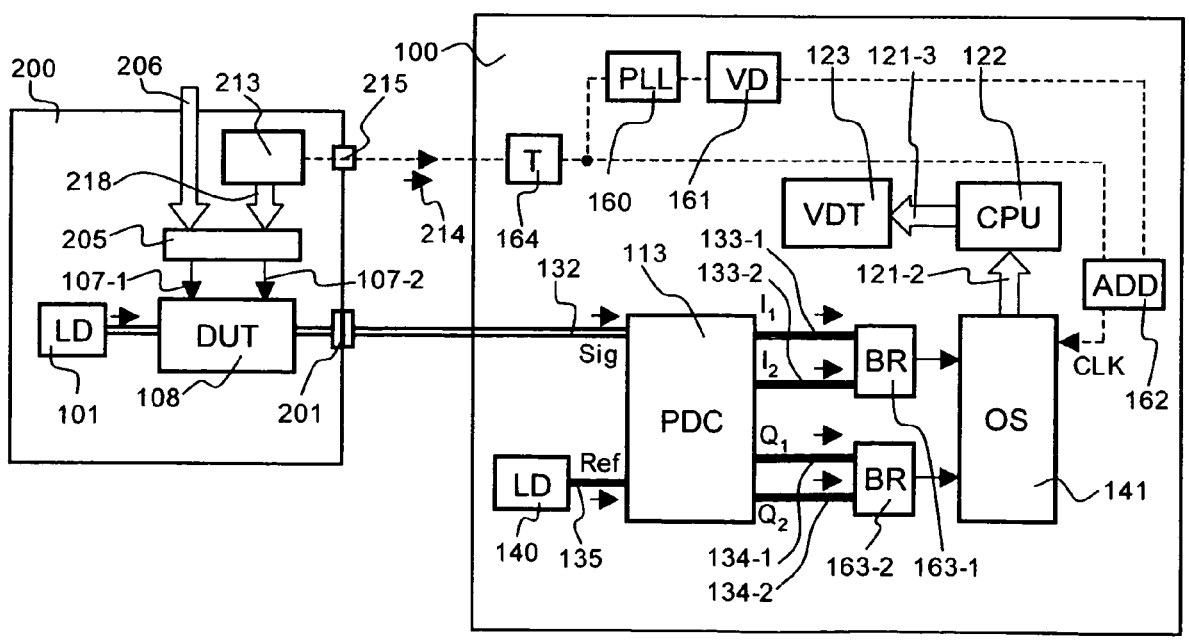
FIG. 18 is a configuration diagram showing a ninth embodiment of the present invention.

FIG. 18 shows a configuration of the ninth embodiment of the present invention. This is another example in which the optical transmitter 200 of the present invention is synthesized with the optical waveform measuring apparatus 100 of digital phase diversity type according to the present invention to thereby measure the output waveform.

Also in the example, only during the waveform measurement, the optical signal is modulated using the repetitive symbol pattern 218 obtained from the repetitive symbol generator 213. The modulated signal is inputted from a modulated light output port 201-1 to the optical waveform measuring apparatus 100 of the present invention together with the trigger signal 214 from a trigger signal output port 213. Therefore, as in the embodiments described above, it is possible to conduct the averaging and the eye pattern display at timing synchronized with the waveform pattern. This enables the high-precision and high-performance waveform measurement.

Particularly, according to the present invention, the waveform such as phase modulated waveforms which are ordinarily invisible can be visualized on the display. Therefore, with the optical waveform measuring apparatus of the present invention connected after the optical transmitter is assembled as shown in FIG. 18, while the waveform measurement is being conducted, the bias condition of the optical modulator 108 and the amplitude of the modulated signal are adjusted such that the phase point allocation is appropriate (e.g., the angle between the adjacent phase points is 90° for the QPSK signal) to thereby obtain an appropriate optically modulated waveform. Thereafter, the adjustment condition is stored in a memory or the like in the optical transmitter and the optical waveform measuring apparatus is separated therefrom. The setting of the optical transmitter is changed so that the encoder 205 receives an information signal 206 to thereby complete the setting of the optical transmitter.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical electric field waveform observing apparatus, comprising:
   a measuring unit which measures through sampling with respect to time an optical electric field of an input optical signal digitally modulated, for each set of an in-phase component and a quadrature component or each set of an amplitude component and a phase angle component;
   an measuring unit which measures by use of optical homodyne interference optical electric field components of an input light digitally modulated using a symbol pattern with a fixed repetitive period; and
   a controlling unit which controls a phase difference between two optical paths of a homodyne interferometer or an optical phase of an optical source,
   the apparatus further comprising either one of:
   a conducting unit which conducts three-dimensional display of a three-dimensional optical electric field waveform in which two optical electric field components are arranged in a time series; and
   a synthesizing unit which synthesizes a three-dimensional optical electric field eye pattern in which two optical electric field components are folded in a time series direction in a time unit which is an integral multiple of one-bit time or one-symbol time of digital modulation and conducting three-dimensional display of a three-dimensional eye pattern.

2. The optical electric field waveform observing apparatus according to claim 1, further comprising either one of:
   a display unit which displays the three-dimensional optical electric field waveform by arbitrarily changing an observing direction of the three-dimensional optical electric field waveform in a three-dimensional space; and
   a selectively-displaying unit which selectively displays the three-dimensional optical electric field waveform or the three-dimensional optical electric field eye pattern in a designated arbitrary range of time, amplitude, angle, or coordinates.

3. The optical electric field waveform observing apparatus according to claim 1, further comprising either one of:
   a repeatedly-measuring unit which repeatedly measures an optical electric field for each period of a repetitive symbol pattern for modulating an input light and averaging a plurality of measured values for a respective component of the measured optical electric field;
   a calculating unit which calculates phase points by synthesizing the respective component with each other and for vector-wise averaging the phase points thereafter;
   a synthesizing unit which synthesizes the respective component with each other and for independently averaging an amplitude component and a phase angle component thereafter; and
   a moving unit which moves the measured values of the optical electric field in a direction of time and for averaging the measured values thereafter.

4. The optical electric field waveform observing apparatus according to claim 1, wherein the controlling unit controls the phase difference between the two optical paths of the homodyne interferometer or the optical phase of an optical source such that:
   either one of a phase value, an in-phase component, and a quadrature component of an optical electric field measured at timing synchronized with the symbol pattern is a fixed value;
   either one of a phase value, an in-phase component, and a quadrature component of an optical electric field measured after a predetermined period of time relative to a start point of the symbol pattern is a fixed value; or
   either one of a phase value, an in-phase component, and a quadrature component of an optical electric field averaged for a fixed period of time beginning at a predetermined period of time relative to a start point of the symbol pattern is a fixed value.

* * * * *

UNITED STATES PATENT AND TRADEMARK OFFICE
CERTIFICATE OF CORRECTION

| | | |
|---|---|---|
| PATENT NO. | : 7,616,318 B2 | Page 1 of 1 |
| APPLICATION NO. | : 11/511221 | |
| DATED | : November 10, 2009 | |
| INVENTOR(S) | : Nobuhiko Kikuchi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 334 days.

Signed and Sealed this

Nineteenth Day of October, 2010

David J. Kappos
*Director of the United States Patent and Trademark Office*